Figure 1:
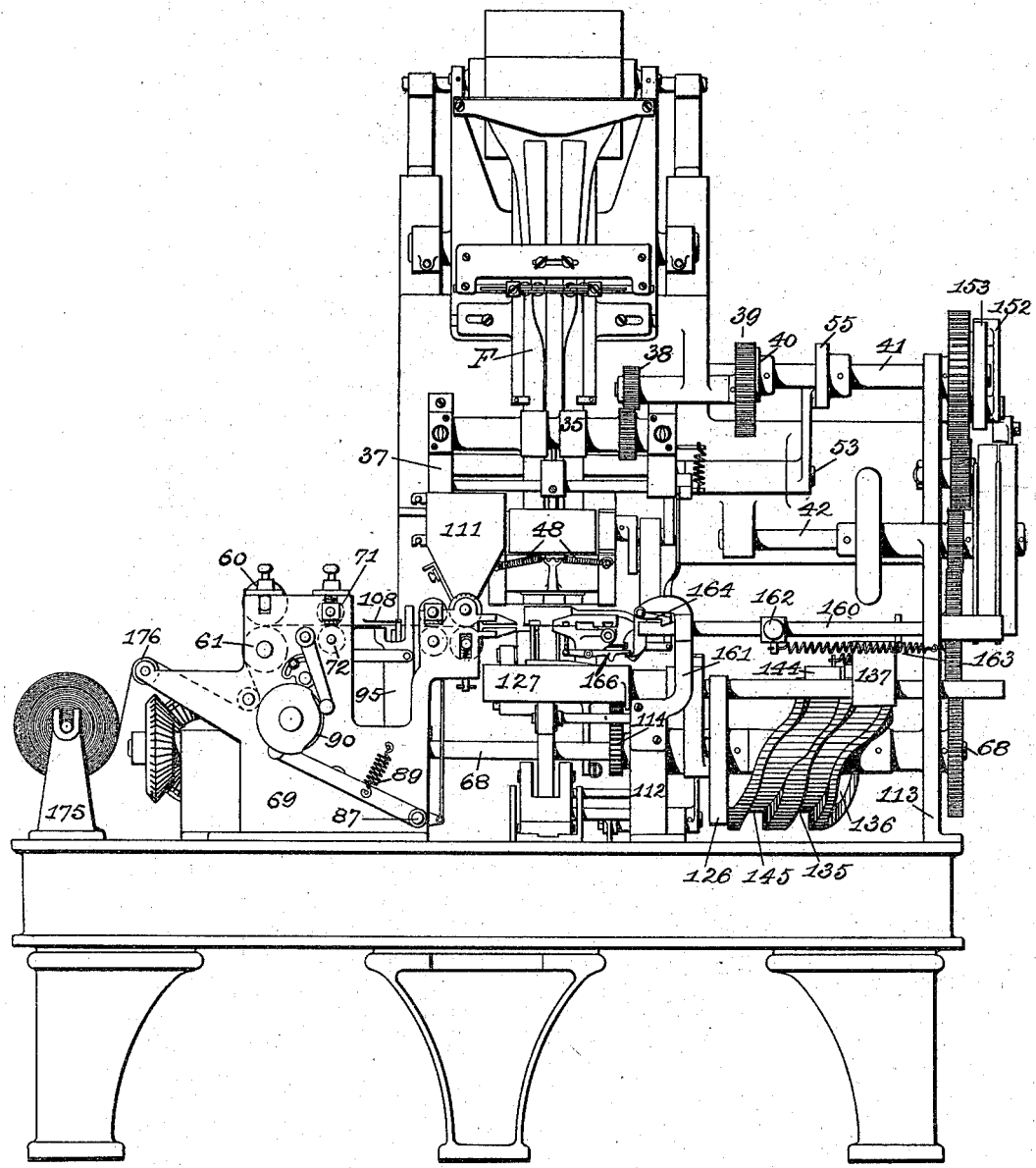

(No Model.) 16 Sheets—Sheet 1.

W. A. LORENZ & W. H. HONISS.
COMPARTMENT BAG MACHINE.

No. 559,140. Patented Apr. 28, 1896.

Witnesses:
A. Mutter
Jennie Willis

Inventors:
William A. Lorenz
William H. Honiss (No Model.) 16 Sheets—Sheet 2.
W. A. LORENZ & W. H. HONISS.
COMPARTMENT BAG MACHINE.

No. 559,140. Patented Apr. 28, 1896.

Witnesses:
A. Mutter
Jennie Nellis

Inventors:
William A. Lorenz
William H. Honiss (No Model.) 16 Sheets—Sheet 3.

W. A. LORENZ & W. H. HONISS.
COMPARTMENT BAG MACHINE.

No. 559,140. Patented Apr. 28, 1896.

Witnesses:
A. Mutter.
Jennie Nellis.

Inventors:
William A. Lorenz
William H. Honiss.

(No Model.) 16 Sheets—Sheet 4.

W. A. LORENZ & W. H. HONISS.
COMPARTMENT BAG MACHINE.

No. 559,140. Patented Apr. 28, 1896.

Witnesses:
Inventors:

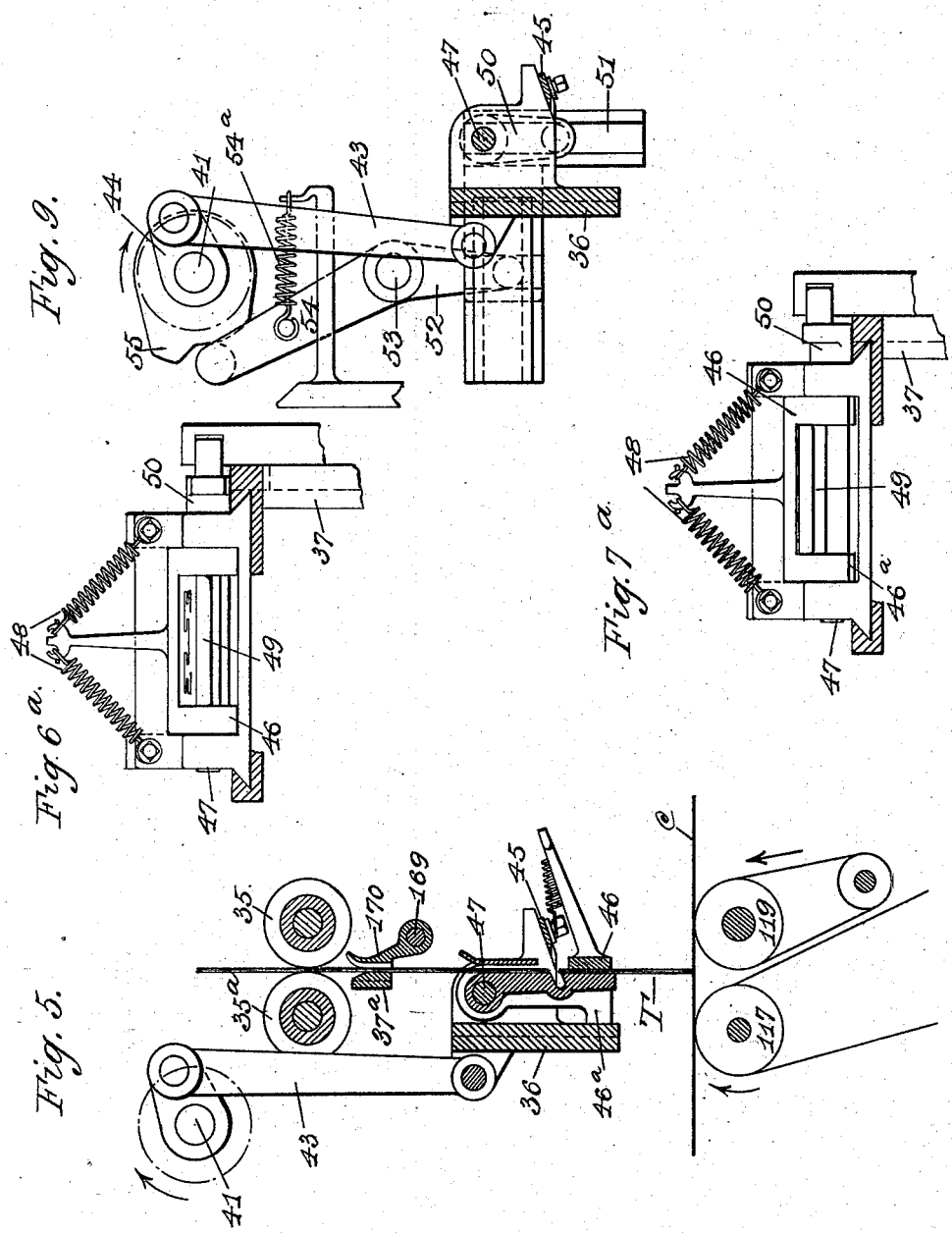

(No Model.) 16 Sheets—Sheet 6.
W. A. LORENZ & W. H. HONISS.
COMPARTMENT BAG MACHINE.
No. 559,140. Patented Apr. 28, 1896.
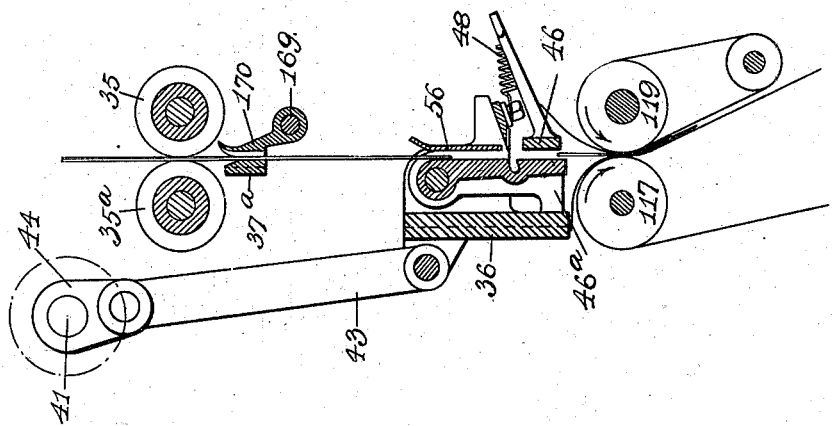
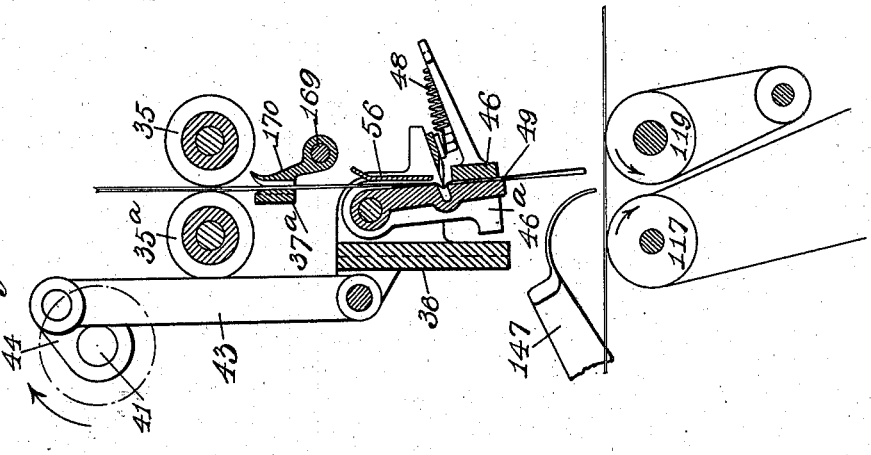
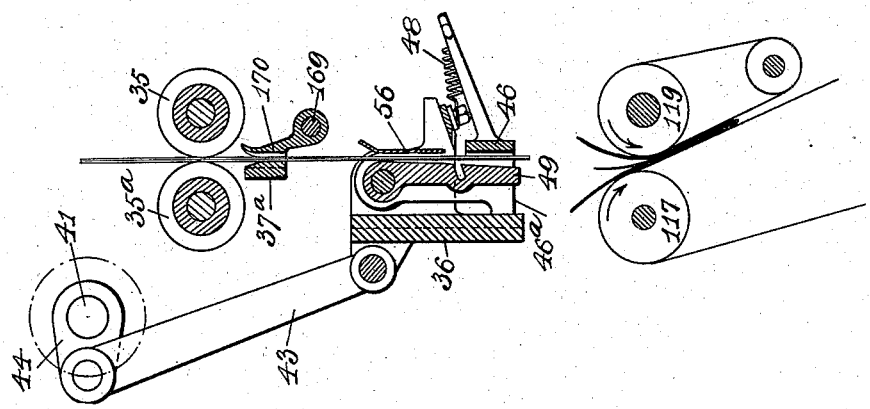

(No Model.) 16 Sheets—Sheet 7.
W. A. LORENZ & W. H. HONISS.
COMPARTMENT BAG MACHINE.
No. 559,140. Patented Apr. 28, 1896.
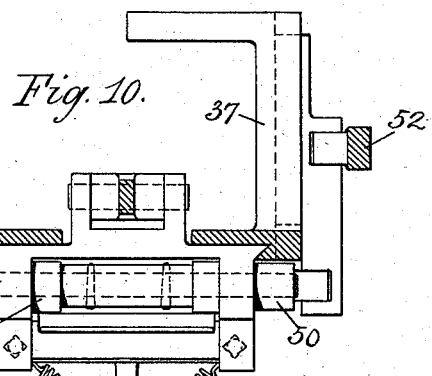
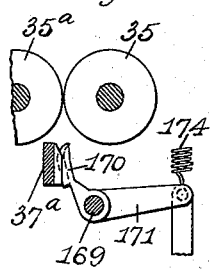
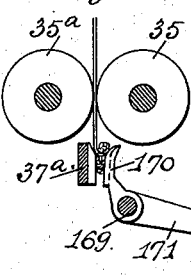
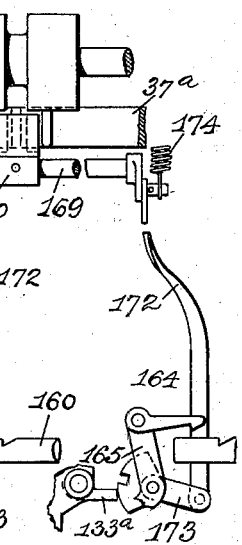
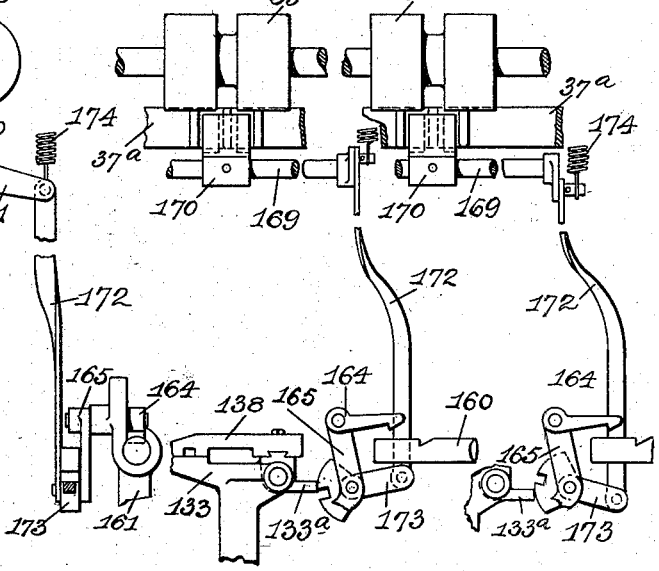
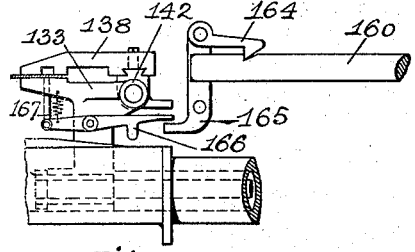
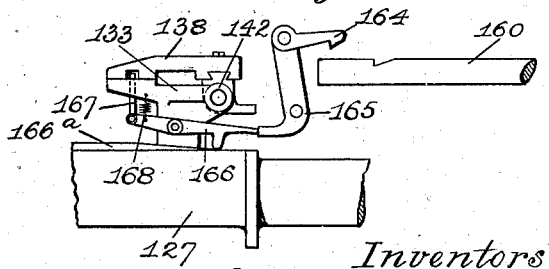
Witnesses:
A. Mutter
Jennie Mellis
Inventors:
William A. Lorenz
William H. Honiss (No Model.) 16 Sheets—Sheet 8.
W. A. LORENZ & W. H. HONISS.
COMPARTMENT BAG MACHINE.
No. 559,140. Patented Apr. 28, 1896.
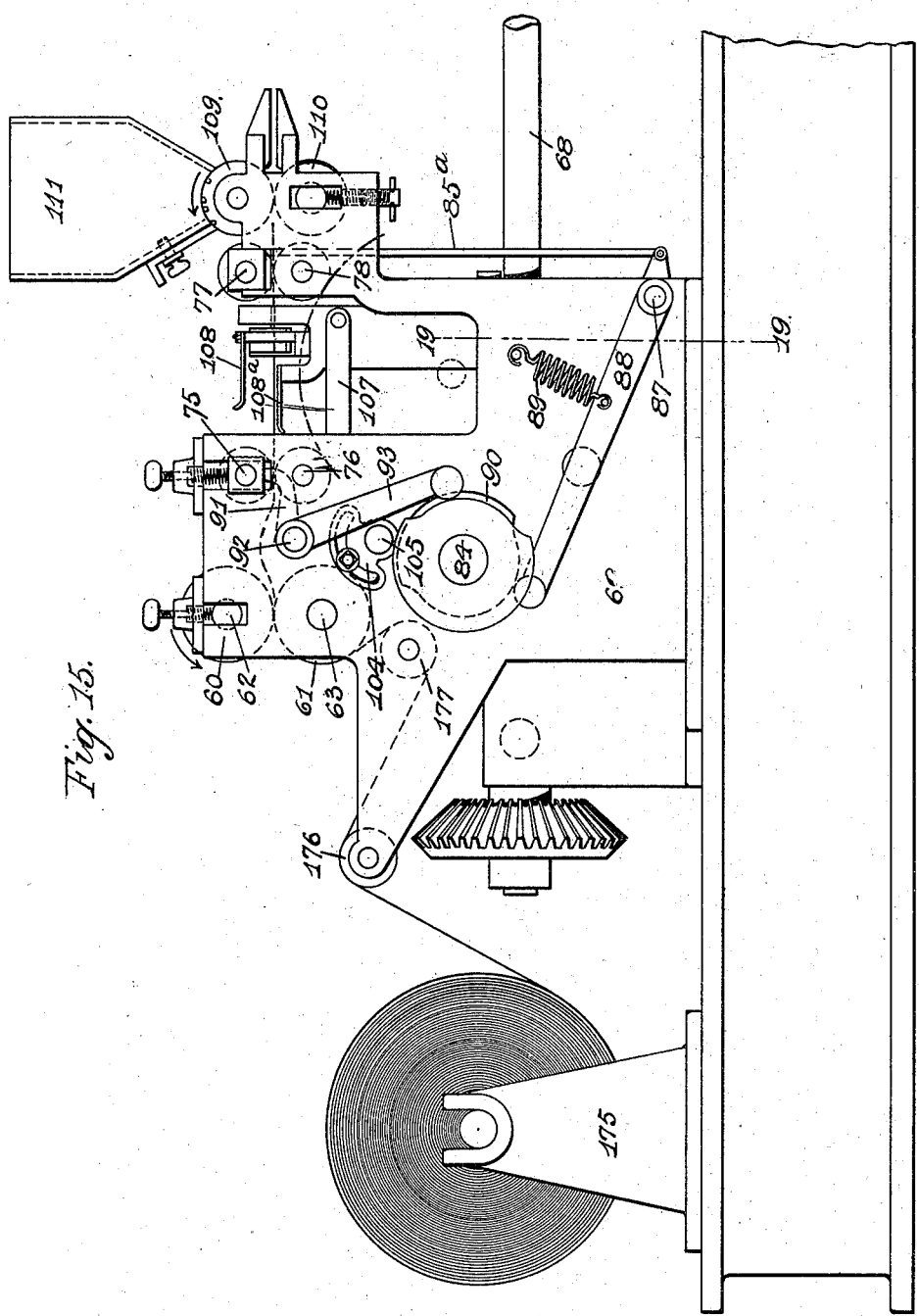
Witnesses:
A. Mutter
Jennie Nellis
Inventors:
William A. Lorenz
William H. Honiss (No Model.)    16 Sheets—Sheet 9.

W. A. LORENZ & W. H. HONISS.
COMPARTMENT BAG MACHINE.

No. 559,140.    Patented Apr. 28, 1896.

Witnesses:
A. Mutter.
Jennie Skellis.

Inventors:
William A. Lorenz
William H. Honiss (No Model.) 16 Sheets—Sheet 10.

W. A. LORENZ & W. H. HONISS.
COMPARTMENT BAG MACHINE.

No. 559,140. Patented Apr. 28, 1896.

Witnesses:
A. Mutter
Jennie Nellis.

Inventors:
William A. Lorenz
William H. Honiss.

(No Model.) 16 Sheets—Sheet 11.

W. A. LORENZ & W. H. HONISS.
COMPARTMENT BAG MACHINE.

No. 559,140. Patented Apr. 28, 1896.

Witnesses:
A. Mutter.
Jennie Nelli.

Inventors:
William A. Lorenz
William H. Honiss

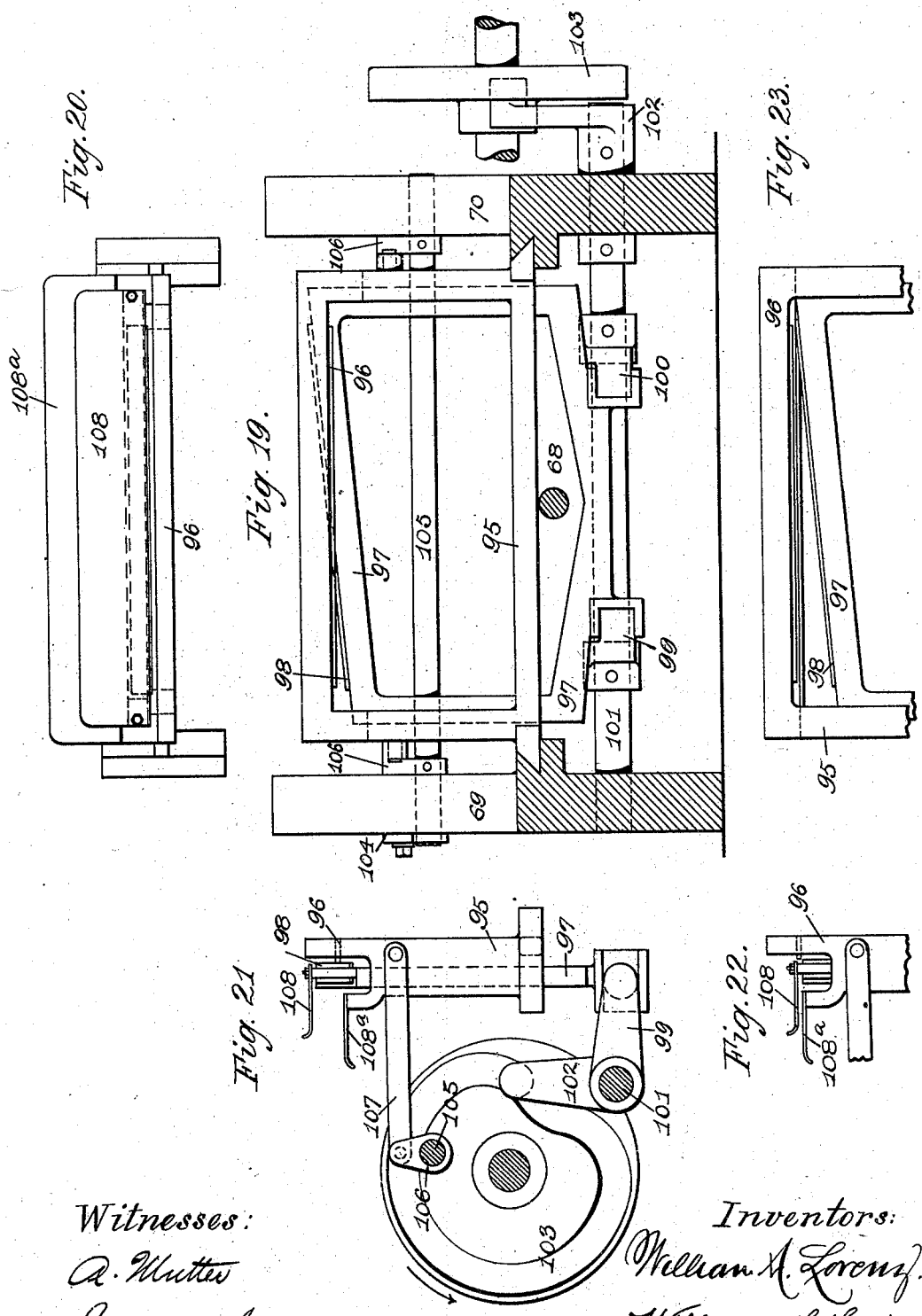

(No Model.) 16 Sheets—Sheet 13.

W. A. LORENZ & W. H. HONISS.
COMPARTMENT BAG MACHINE.

No. 559,140. Patented Apr. 28, 1896.

Witnesses:
Inventors:
William A. Lorenz
William H. Honiss

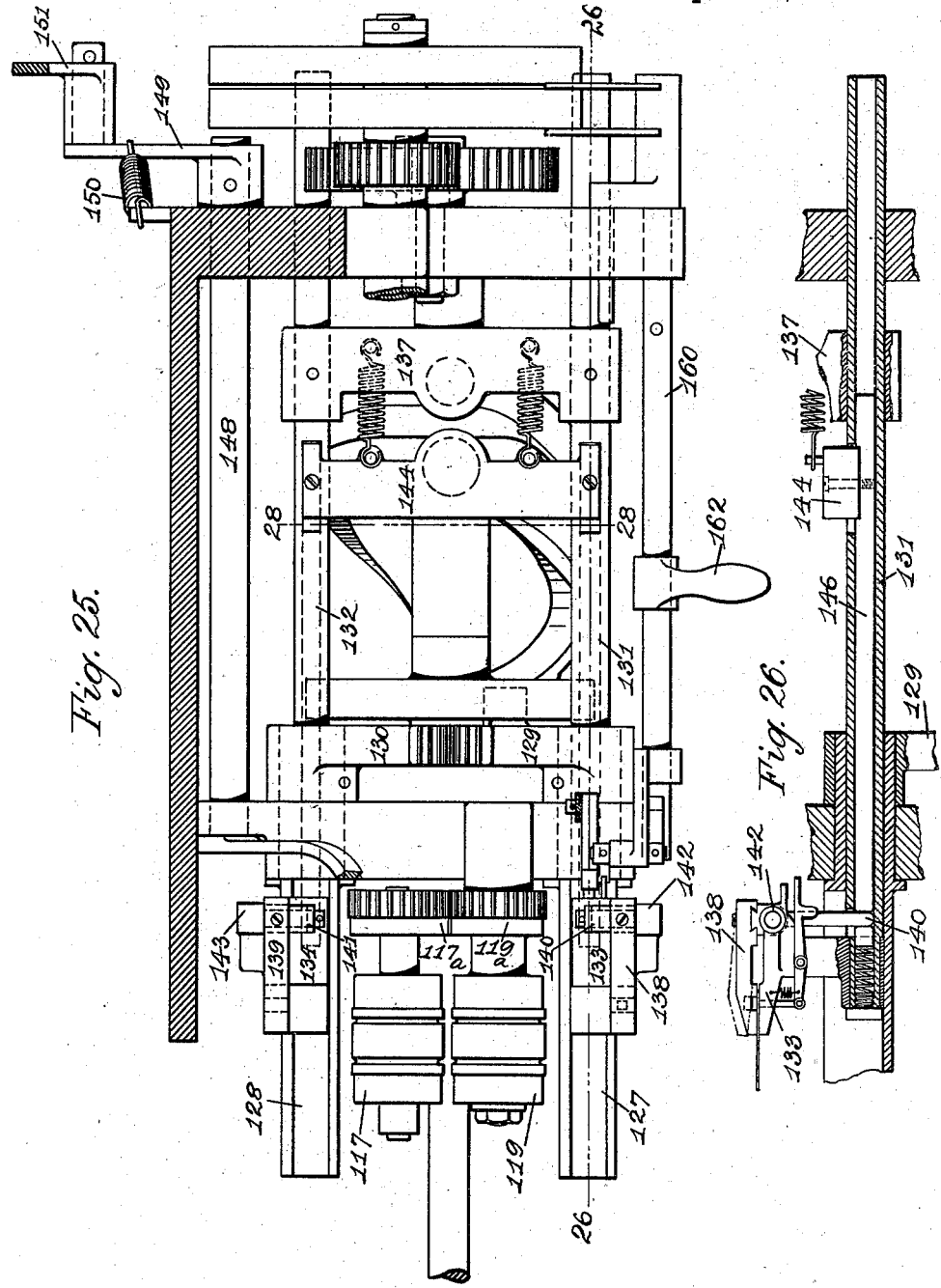

(No Model.) 16 Sheets—Sheet 15.

W. A. LORENZ & W. H. HONISS.
COMPARTMENT BAG MACHINE.

No. 559,140. Patented Apr. 28, 1896.

Witnesses:
A. Mutter
Jennie Kellis

Inventors:
William A. Lorenz
William H. Honiss (No Model.) 16 Sheets—Sheet 16.

W. A. LORENZ & W. H. HONISS.
COMPARTMENT BAG MACHINE.

No. 559,140. Patented Apr. 28, 1896.

Witnesses:
A. Mutter.
Jennie Nellis.

Inventors:
William A. Lorenz
William H. Honiss

UNITED STATES PATENT OFFICE.

WILLIAM A. LORENZ AND WILLIAM H. HONISS, OF HARTFORD, CONNECTICUT.

COMPARTMENT-BAG MACHINE.

SPECIFICATION forming part of Letters Patent No. 559,140, dated April 28, 1896.

Application filed June 14, 1895. Serial No. 552,859. (No model.)

*To all whom it may concern:*

Be it known that we, WILLIAM A. LORENZ and WILLIAM H. HONISS, citizens of the United States, residing at Hartford, in the county of Hartford and State of Connecticut, have invented certain new and useful Improvements in Compartment-Bag Machines, of which the following is a full, clear, and exact specification.

This invention is a machine for automatically manufacturing compartment paper bags, such as those shown and described in Letters Patent of the United States to William A. Lorenz, No. 471,257, of March 22, 1892. This machine, as herein shown and described, is particularly adapted to the making of that compartment-bag shown in Figures 1 to 11, inclusive, of the above-mentioned patent, although it may in practice be readily adapted to make the bag shown in Figs. 15, 16, and 17 by substituting suitable formers for the inner or tube portion and by suitably arranging the change-gears.

The construction and arrangement of the formers which we prefer to use in connection with this machine are not herein shown, excepting in Fig. 1, as they form the subject-matter of a separate application.

For greater convenience in explaining and describing this machine we will here state that we shall consider the machine as being (somewhat arbitrarily) divided into three sections, as follows: first, the tube-section, comprising that portion shown in the middle part of Fig. 1, which is more clearly shown in Fig. 2, the function of which is to draw the plaited endless tube from the former, sever it into suitable lengths, and deliver it to the folding-section in proper relation to the cover; second, the cover-section, (shown in the lower left-hand part of Fig. 1, and shown also in enlarged scale in Fig. 15,) comprising that part of the machine which draws the web of paper from the roll, severs from it transverse slips adapted to form the cover of the bag, deposits upon that cover suitable lines of paste, and delivers it to the folding-section; third, the folding and delivery section, (shown at the lower right-hand side of Fig. 1,) comprising the mechanism which receives the tube and the cover from their respective sections of the machine and folds the two ends of the cover together upon the outside of that tube, then presses and delivers the completed bag into a suitable box or rack.

Fig. 1 of the drawings is a front elevation representing the entire machine drawn to reduced scale in order that the correct position and relation of the parts to each other may better be understood. Fig. 2 is a front elevation, drawn to enlarged scale, of the tube-section and of a portion of the folding-section of the machine of Fig. 1, comprising the drawing-rolls and that part of the machine which is concerned in the cutting off and feeding of the plicated "tube." Fig. 3 is a side elevation of what is shown in Fig. 2, looking from the left-hand side in that figure. Fig. 4 is a side elevation of what is shown in Fig. 2, looking from the right-hand side in that figure, showing the driving-pulleys and gearing. Figs. 5, 6, 7, and 8 are side views in section, taken on the vertical center line 5 5 of Fig. 2, showing the drawing-rolls, the carriage which cuts off and feeds the tube, and the delivery-rolls, showing four different stages of the progress of the blanks through the machine. Figs. 6$^a$ and 7$^a$ are end views, looking upward, of the cutting-off devices in the positions shown in Figs. 6 and 7, respectively. Fig. 9 is a side view in section, taken on the vertical center line 5 5 of Fig. 2, with portions of the carriage removed, so as to show more clearly the construction of the parts which actuate the cutting-off plate. Fig. 10 is a plan view in section, taken on the line 10 10 of Fig. 2, of the carriage and its cutting-off mechanism. Figs. 11 and 12 are a side view and a front view, respectively, of a device which automatically operates to stop the machine, illustrating its mode of operation when the paper tube is absent. Figs. 13 and 14 are similar views showing the operation of the automatic stop device whenever for any reason the tube becomes jammed or choked. Figs. 15 to 23, inclusive, are various views representing the lower left-hand or cover section of the machine, this mechanism being concerned in the production of the cover portion of the compartment-bag shown in Fig. 1 of the above-mentioned patent, No. 471,257. Fig. 15 is a front elevation, and Fig. 16 a plan view, of the cover-section. Fig. 17 is an elevation in section taken on the center line 17 17 of Fig. 16.

Figure 16:
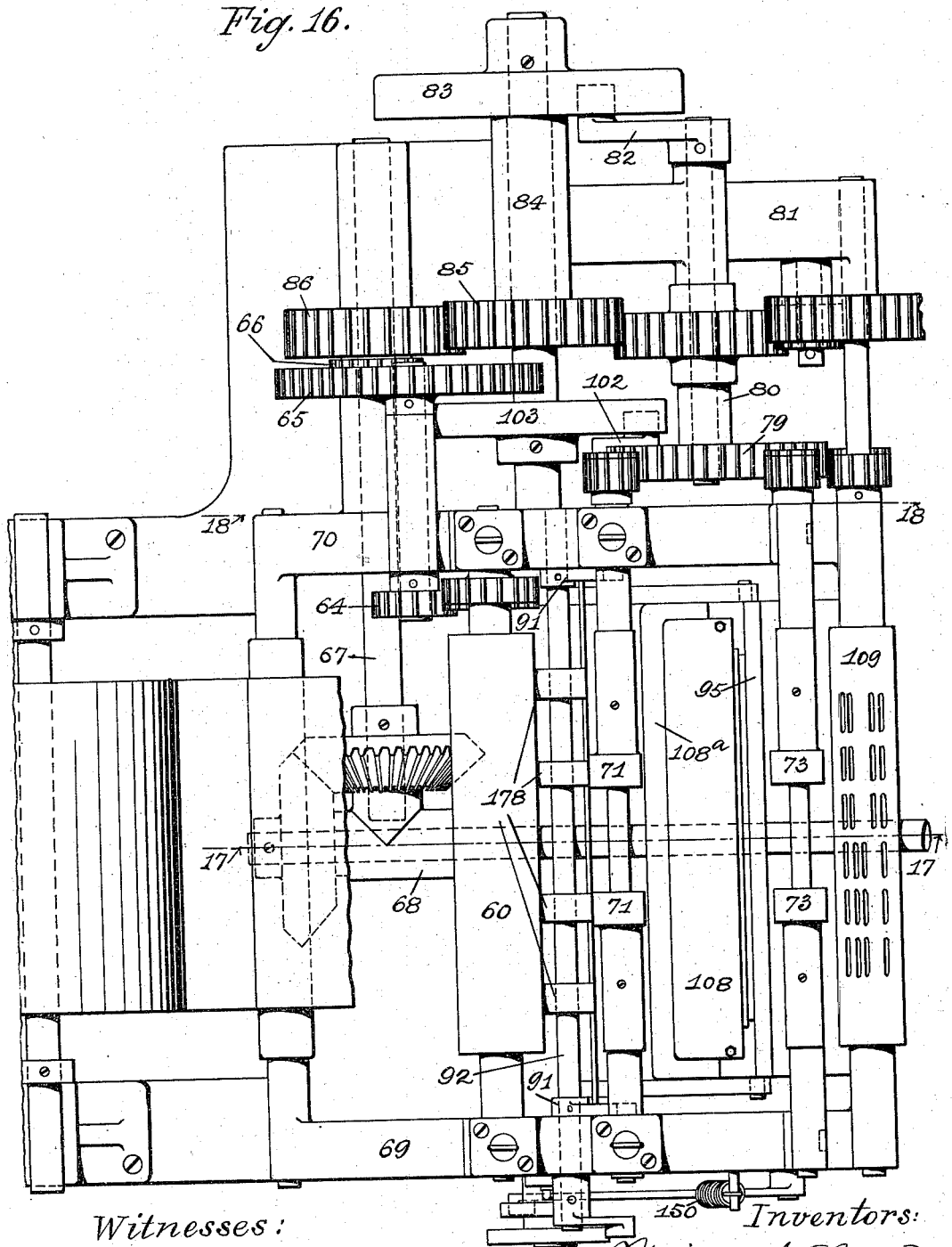
Figure 17:
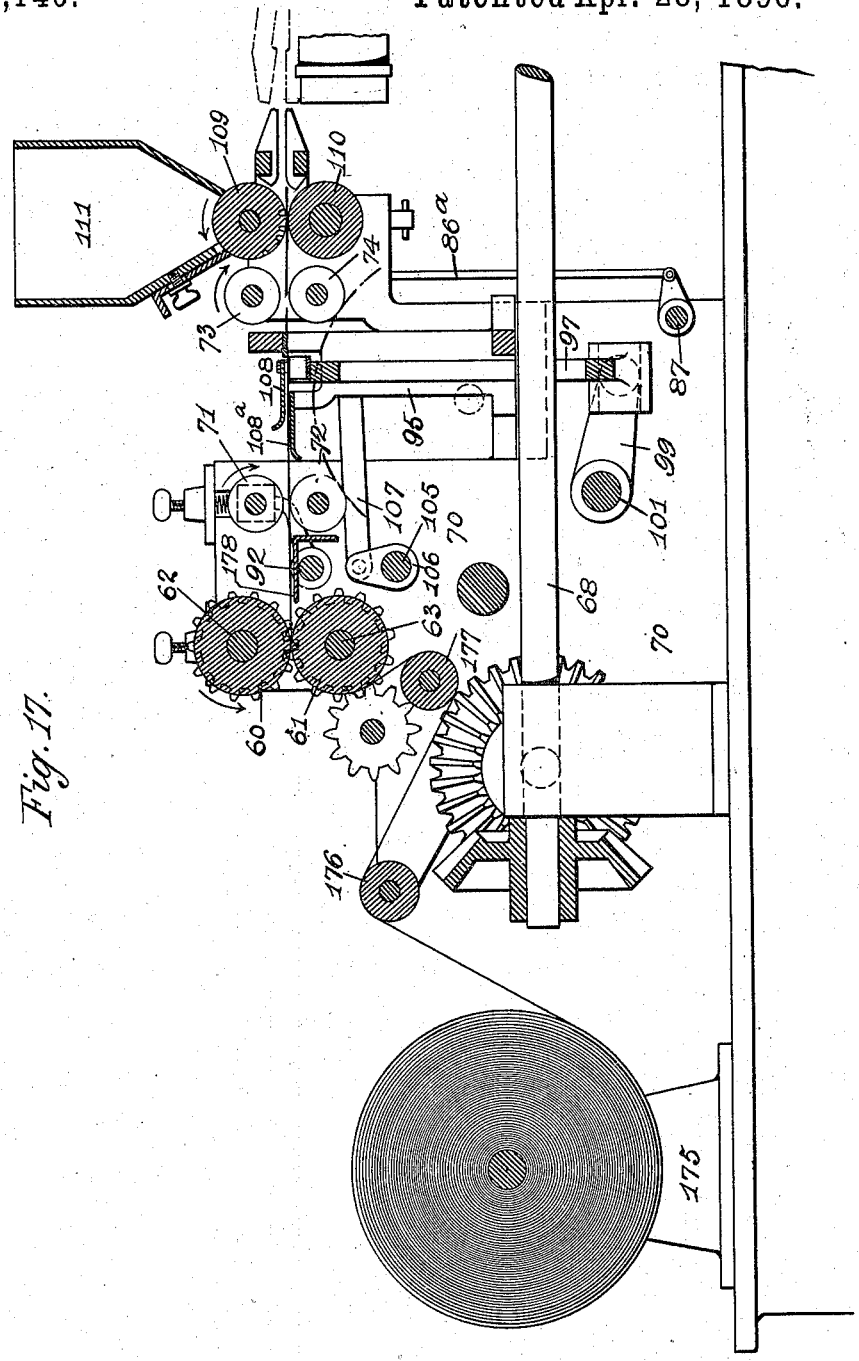
Figure 18:
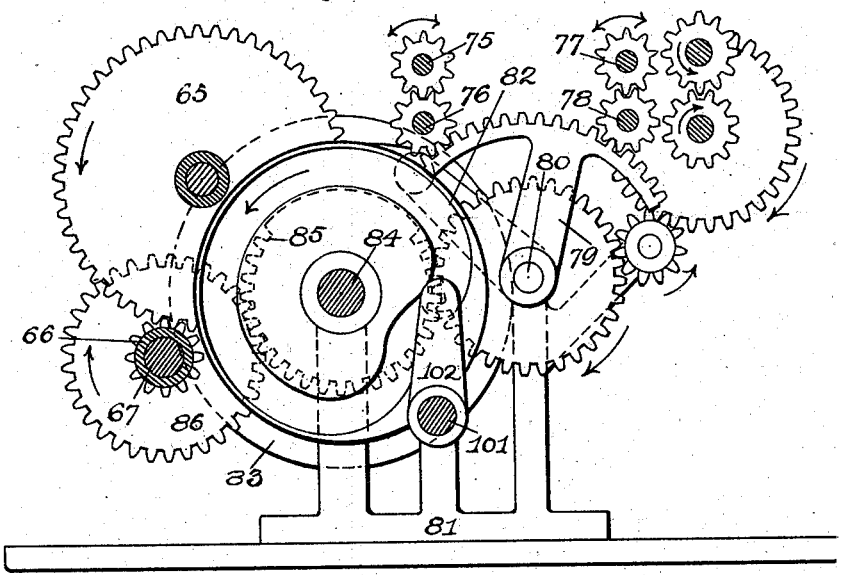
Figure 33:
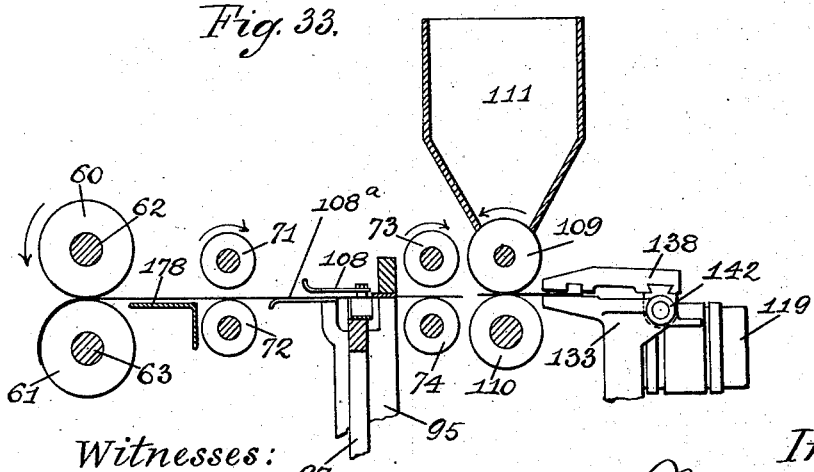
Figure 24:
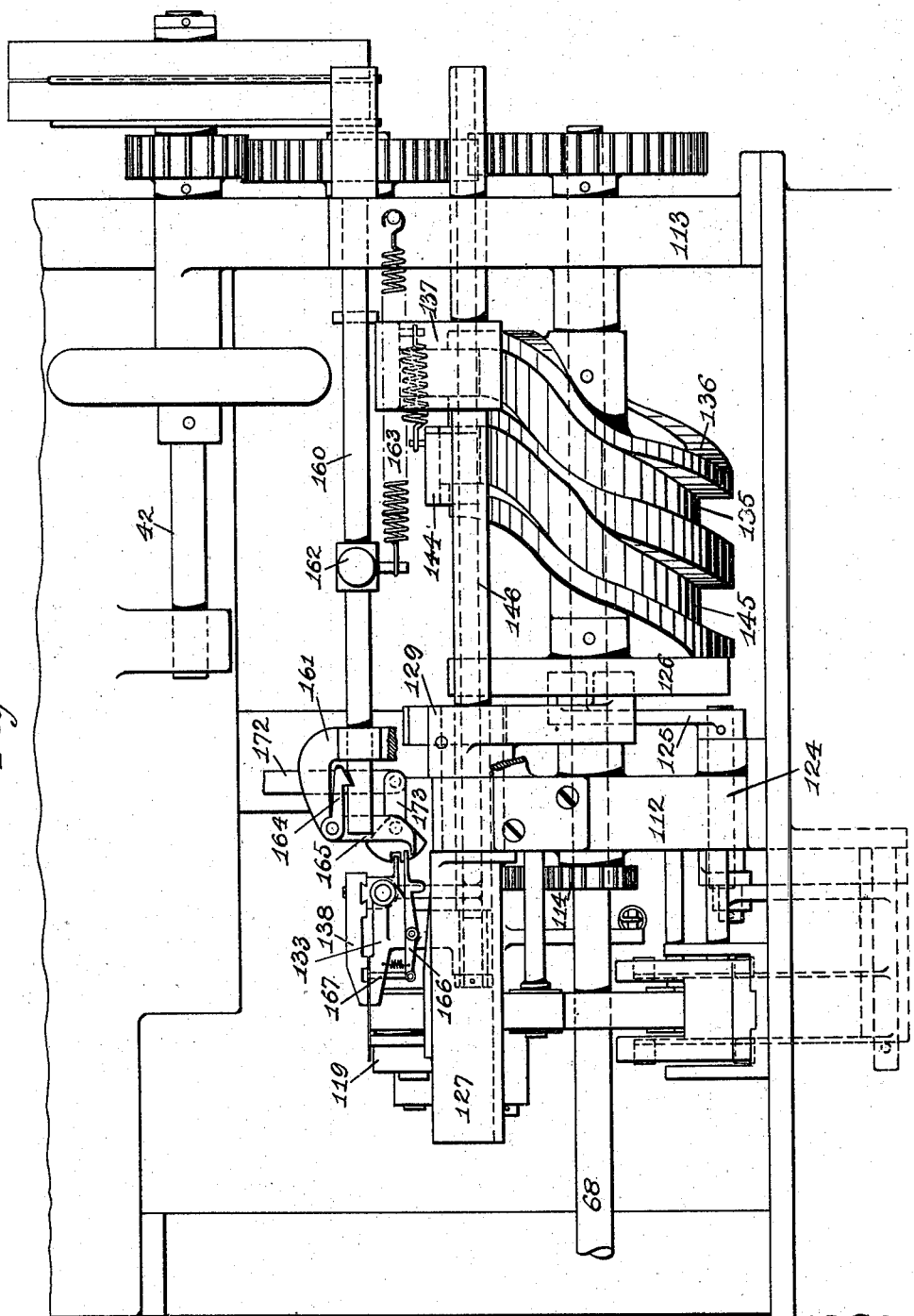
Figure 27:
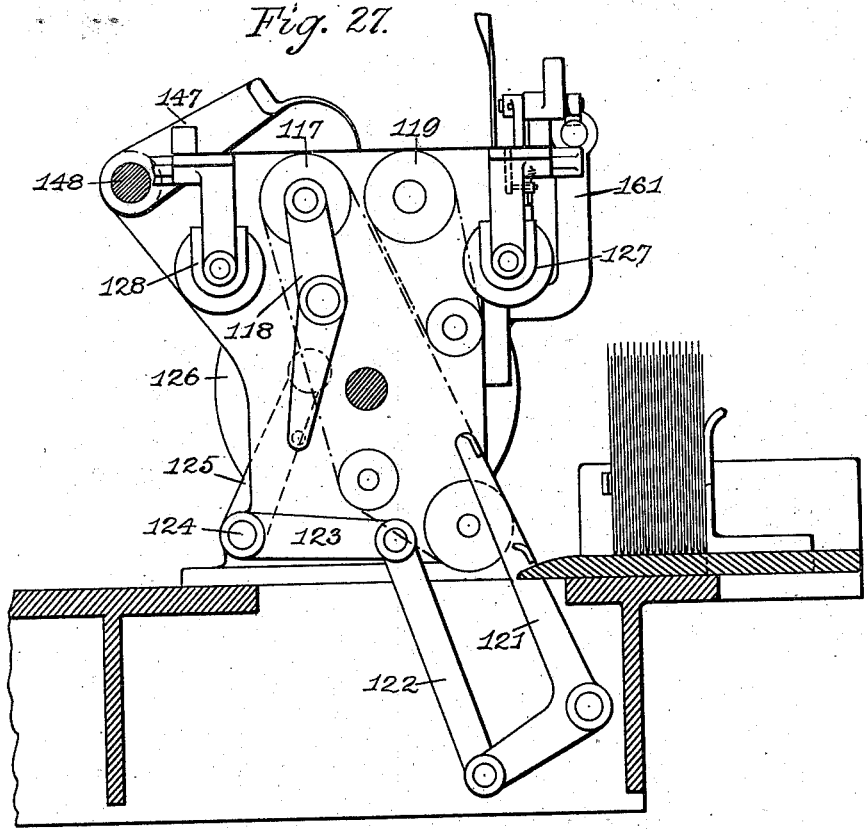
Figure 28:
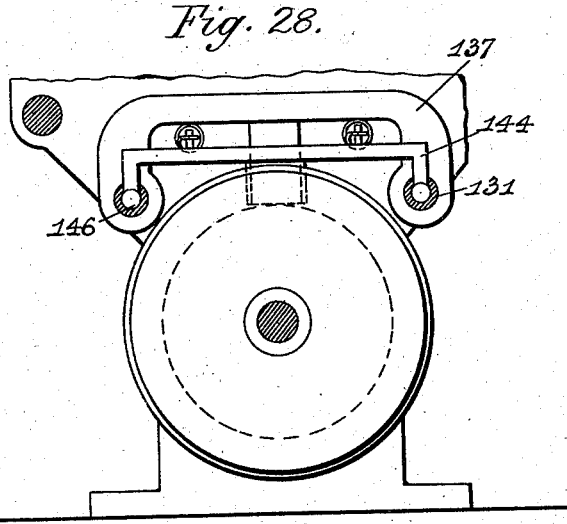
Figure 29:
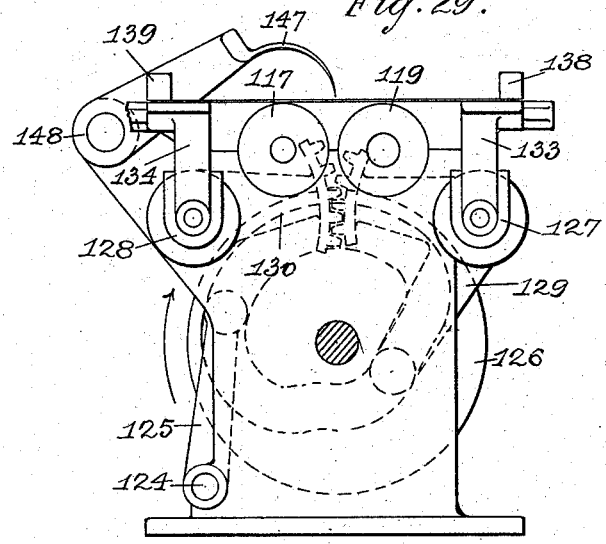
Figure 30:
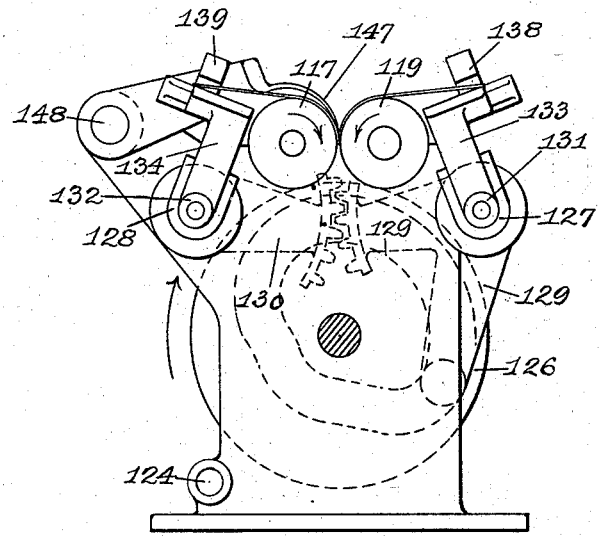

Fig. 18 is a front elevation in section taken on the line 18 18 of Fig. 16. Fig. 19 is a side view in section, taken on the line 19 19, through the framework of Fig. 15, showing the mechanism which shears from the web of paper a suitable width for the cover. In this view the shear is shown to be moved up to about its half-stroke position. Fig. 20 is a plan view of what is shown in Fig. 19, omitting the framework and cam of the latter figure. Fig. 21 is a front view of the shear mechanism of Figs. 19 and 20. Fig. 22 is a fragmentary side view, similar to Fig. 21, showing the shear in its downward position. Fig. 23 is a side view of what is shown in Fig. 22. Fig. 24 is a front elevation of the lower right-hand or cover section of the machine. That section comprises the mechanism which receives the cut-off and pasted cover from the cover-section and unites it with the plaited tube received from the tube-section. Fig. 25 is a plan view of what is shown in Fig. 24, omitting the hand-wheel and its shaft in order to show the mechanism below more clearly. Fig. 26 is a front view in section, taken on the line 26 26 of Fig. 25, showing the construction of the mechanism which carries and operates the front cover gripper. Fig. 27 is an end view of what is shown in Fig. 25, showing the mechanism for pressing and delivering the completed bag from the machine. Fig. 28 is a cross-section taken on the line 28 28 of Fig. 25. Figs. 29 and 30 are side views of the folding mechanism shown in the upper portion of Fig. 27, representing them in two different positions in their folding operation. Figs. 31 and 32 are front views showing the construction and mode of operation of the devices which automatically stop the machine if no cover is delivered to the gripper, Fig. 31 representing the parts in their normal position with a cover engaged by the gripper and Fig. 32 showing them without a cover, in which they therefore operate to stop the machine. Fig. 33 is a diagrammatic side view showing some of the cover-section parts and the carrier with its gripper in the position occupied by them when a cover is being delivered to the carrier.

A brief description will now be given of the different sections in their logical sequence, beginning with

*The Tube-Section.*

Figure 2:
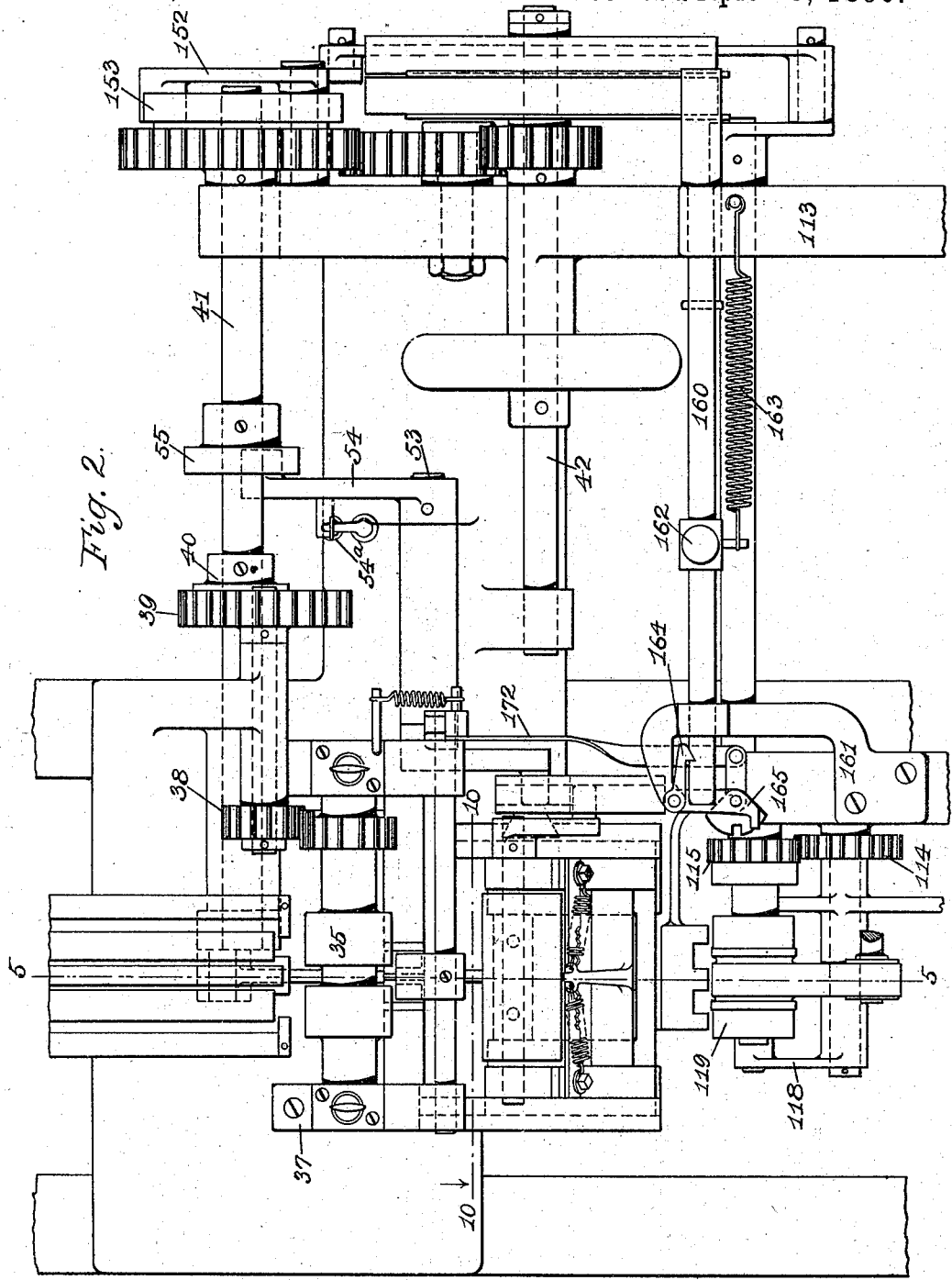
Figure 3:
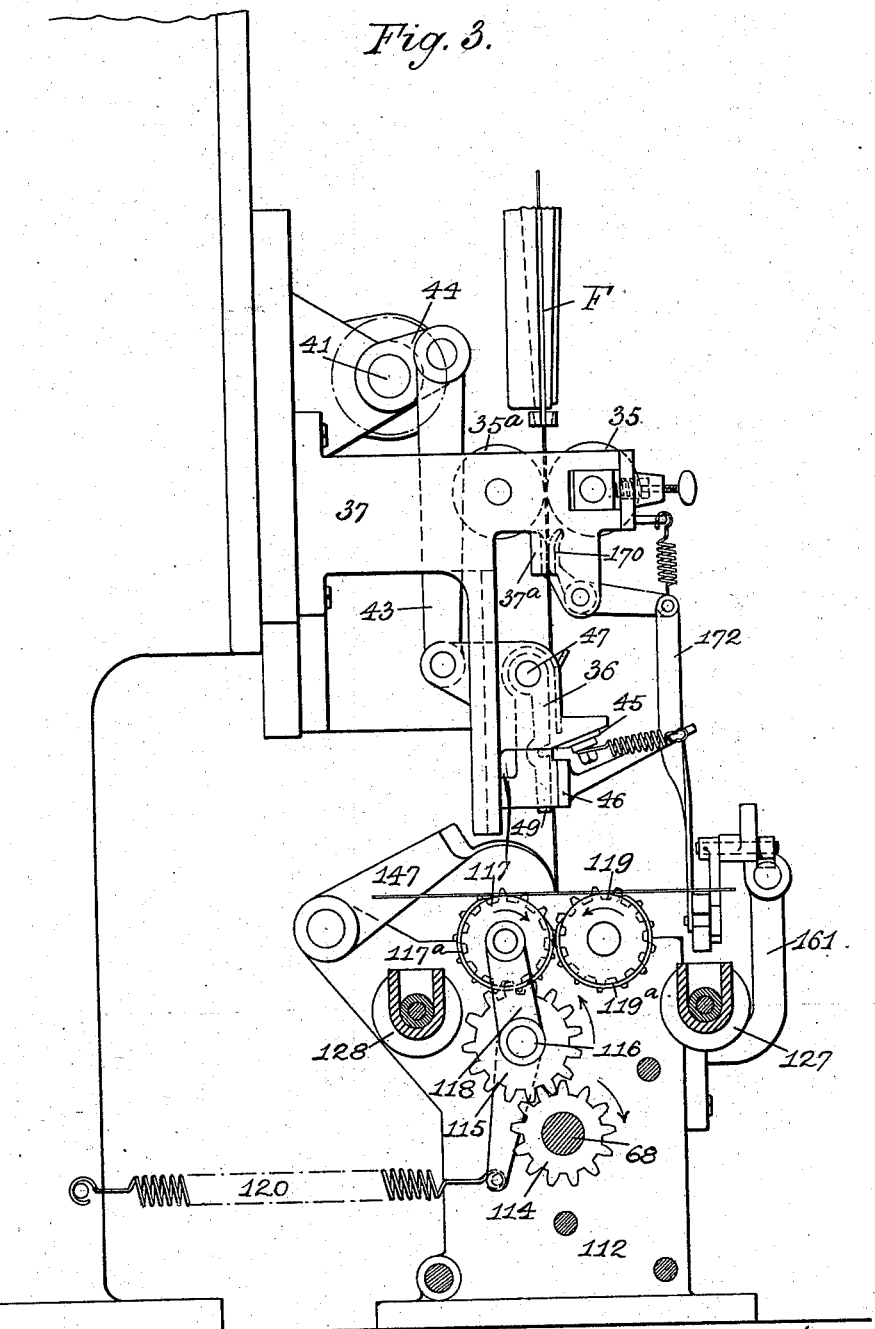
Figure 4:
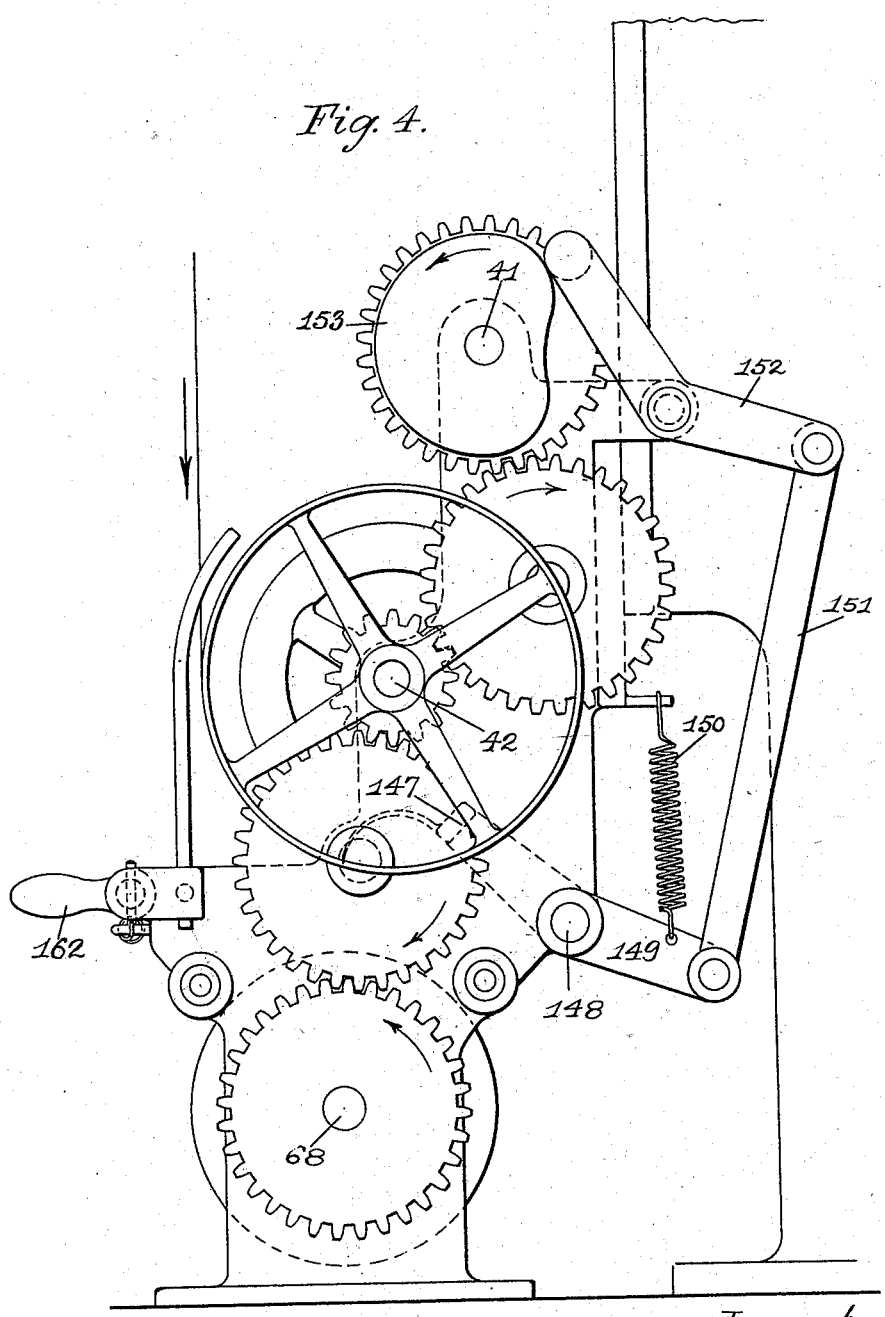

The general construction of this section is best shown in Figs. 2, 3, and 4, and its principal constituents are the drawing-rolls 35 and 35$^a$ and the carriage 36, the function of the drawing-rolls being to draw the continuous plaited tube into the machine from the formers, which are indicated in a general way by the letter F, while the carriage is adapted to reciprocate in slides of the bracket 37 and carry the devices immediately employed in the transverse severing of the tube. The drawing-rolls are revolubly mounted in the usual manner in the bracket 37 and are connected by suitable gearing driven by means of the intermediate gears 38 and 39 from the pinion 40 on the shaft 41. As shown in Fig. 4, that shaft is positively driven by means of gears from the driving-shaft 42, on which are mounted tight and loose pulleys, as shown in Figs. 2 and 4. Upon the shaft 42 is also fixed a hand-wheel for convenience in operating the machine while assembling it or getting it ready for work.

The carriage 36 is driven by means of a connecting-rod 43 from a crank 44, fixed on the end of the shaft 41, and the revolutions of the drawing-rolls are so timed with relation to the crank as to cause those rolls to feed forward a suitable length of tubing at each reciprocation of the carriage.

The carriage has fixed upon it the knife 45, so located thereon as to present its edge, preferably serrated, in a transverse relation to the tubing. A clamping-plate 46, located upon the carriage in advance of the knife, is loosely mounted at its ends upon the shaft 47, as best seen in Figs. 5 and 10. That plate is provided with a foot 46$^a$, which rests upon the carriage 36 and forms a limiting-stop for the lower position of the plate, as shown in Figs. 6 and 8. The springs 48 are attached to fixed portions of the carriage 36 and to the clamping-plate and operate to hold the latter with a suitable tension in its lower position. (Shown in Figs. 6 and 8.) The cutting-off plate 49 is fixed upon a shaft 47 and extends beyond the location of the knife, and at its lower end is adapted to engage with the clamping-plate 46. A groove is made transversely in the plate adjacent to the knife to enable it to clear the latter when the plate is in its highest position. Upon the end of the shaft 47 is fixed the arm 50. (Best shown in Figs. 2, 9, and 10.) That arm extends downward and its end is adapted to engage in a vertical slot in the side of the cam-plate 51. That cam-plate is fitted to slide horizontally in the bracket 37, being actuated by the arm 52. (Best shown in Fig. 9.) That arm is fixed upon one end of the shaft 53, journaled in a hub on the main frame of the machine, and has fixed upon its opposite end the cam-arm 54, which is held by the spring 54$^a$ into engagement with the cam 55, fixed on the shaft 41, as best shown in Fig. 9. Referring to the latter figure, it will be seen that the oscillatory movement of the shaft 53, caused by the cam 55, will communicate to the cam-plate a movement transverse to the direction of the arm 50. That movement is adapted to communicate to the cutting-off plate 49 at a suitable time an extent of movement shown by a comparison of Figs. 6 and 7.

The carriage is provided with the guide-plate 56, located on the opposite side of the tube from the cutting-off plate 49, and the tube is fed from the drawing-rolls between the guide-plate and the cutting-off plate. In the position shown in Figs. 6 and 6$^a$ the cutting-off plate 49 is dropped away from the clamping-plate 46, so as to allow the tube to pass between them also. When a suitable length of tubing has been fed beyond the knife 45, the cutting-off plate, by means of its cam 55, is pressed against the clamping-plate, and by the continued operation of the cam 55 the cutting-off plate and the clamping-plate, holding the tube firmly clamped between them, carry the latter quickly against the transverse knife, as shown in Figs. 7 and 7ª, so that the knife severs the tube and passes into the transverse slot of the cutting-off plate. Still holding the severed tube firmly clamped between them, the plates 46 and 49, by the operation of their cam, drop back to the position shown in Fig. 5 and present the severed tube in suitable relation to its cover, (indicated by the letter C.)

Referring to the positions of the crank in Figs. 5, 6, 7, and 8, it will be seen that the carriage has been moved from its highest to its lowest position, and that the operation of severing the tube occurs at a time when the crank is moving at about its highest rate of speed, which at this time is somewhat in excess of the linear speed of the drawing-rolls. This operates to stretch the tube tightly just before and during the time it is severed by the knife. From the moment the severed blank T is separated from its tube it is carried forward by the carriage at an accelerated rate and its advance end is pressed into contact with the cover C at the folding-line of the latter, which, with the coöperation of the folder-blade 147, operates to double that cover and push it down between the delivery-rolls 117 and 119. When the advance end of the tube thus inclosed between the plies of its cover reaches the point where it is safely engaged by the delivery-rolls, the cutting-off plate 49 by the operation of its cam is allowed to drop away from the clamping-plate and thus release the tube-blank, the parts at this time being in the position shown in Fig. 8, with the carriage at its lowest position. From this point the carriage returns, meets the new end of the tube, and severs the next blank from it as before.

Description of that portion of the automatic stop device which is shown in connection with the mechanism just described will be deferred until a description of the entire stop mechanism is given.

*The Cover-Section.*

This is shown in enlarged scale in Figs. 15 to 23, inclusive, and consists, as already stated, of those parts of the machine which sever the covers transversely from a continuous web of paper, apply paste thereon, and pass it on to the folding-section.

The drawing-rolls 60 and 61 are loosely mounted on the shafts 62 and 63, respectively, which are pressed together by tension-springs in the usual manner. The ends of the shafts 62 and 63 are mounted in brackets 69 and 70, and the rolls are operatively connected at their ends by gearing which receives its motion by means of the intermediate gears 64 and 65 from the pinion 66 on the shaft 67. The latter shaft receives its motion by means of bevel-gears from the main cam-shaft 68, which runs the entire length of the machine and receives its motion by suitable gearing from the driving-pulley and its pinion, as best shown in Fig. 4. The intermediate gearing between the shaft 68 and the drawing-rolls 60 and 61 is so proportioned that the rolls are adapted to feed forward a length of the web suitable for the width of the required cover with each of the revolutions of the shaft 68, and the width of those covers may therefore be changed by suitably changing the proportion of the intermediate gearing. The take-up rolls 71 and 72 and the feed-rolls 73 and 74 are fixed upon the shafts 75, 76, 77, and 78, respectively, and the lower of these two sets of shafts 76 and 78 are revolubly mounted in bearings in the brackets 69 and 70, and are provided at their rear ends with toothed pinions. (Best seen in Fig. 18.) The pinions mesh with the sector-gear 79, and that gear is fixed upon the end of the shaft 80, which is journaled in the bracket 81 and is provided at its opposite end with the cam-arm 82, which engages with the cam 83, fixed upon the shaft 84. That shaft is also journaled in the bracket 81, and is so driven by means of the gears 85 and 86 from the shaft 67 that the cam 83 makes equal revolutions with the main cam-shaft 68. The shafts 75 and 77 of the upper take-up and feed rolls, respectively, are journaled in boxes fitted in the brackets 69 and 70, and are provided with pinions fixed thereto, which mesh with the pinions of the lower rolls 72 and 74. The roll 71 is pressed into contact with its mate by means of springs and tension-screws in the usual manner, while the boxes which form the bearings for the ends of the shaft 77 have fixed to them the rods 85ª and 86ª, respectively, which extend downward through their respective brackets and are connected to arms fixed on the shaft 87. (Best shown in Figs. 15 and 17.) As seen in the former figure, the shaft 87 has fixed upon its outer end a cam-arm 88, which is held by means of the spring 89 into contact with a cam 90, which is fixed upon the end of the shaft 84. The spring 89 also operates to press the roll 73 into contact with its mate 74. The cam 90 operates, by means of its connection with the boxes of the shaft 77, to lift that shaft and its roll 73 out of contact with the lower roll, as shown in Fig. 17, this lifting being done in order to allow the rolls 73 and 74 to be turned backward by the reverse motion of the sector 79. The roll 71 is similarly raised from contact with the roll 72 at suitable times by means of the arms 91, which are fixed to the shaft 92, and that shaft has fixed upon its front end the cam-arm 93, as shown in Fig. 15.

The means for operating the knife or shear are best shown in Figs. 19 and 21. The arms 99 and 100 are fixed upon the shaft 101, and their outer ends engage in horizontal grooves or slots in the lower portion of the shear-slide 97. The shaft 101 is journaled in the brackets 69 and 70, and has fixed upon its rear end the cam-arm 102, adjacent to and adapted to engage with the cam 103, fixed upon the shaft 84, by means of which a vertically-reciprocating movement is imparted to the lower blade 98 of the shear at suitable times in the operation of the machine.

The carriage 95, carrying the shear and its operating mechanism, is made adjustable longitudinally of the web of paper, in order to enable different widths of cover to be delivered in proper register with their respective tubes at the folding-section. The width of the cover depends upon the relative speed of the drawing-rolls to each operation of the shear, and that width may therefore be changed by suitably altering the relative sizes of the gears 64, 65, and 66. As the center of each cover, whatever its width, must deliver in register with the center of its tube, it follows that the shear must be farther from the folding-section when cutting wide covers than when cutting narrow ones, the amount of adjustment required being equal to one-half of the difference in the widths of the respective covers.

The shear-carriage 95 is adjusted from the front of the machine by means of the slotted arm 104, fixed upon the shaft 105. That shaft is journaled in the brackets 69 and 70, and has fixed upon it, inside of the brackets, the arms 106, which are connected by means of the rods 107 to the ends of the shear-carriage. It will be seen that the carriage may thus be moved to any desired position and may be clamped therein by means of the screw shown in connection with the slotted arm 104. The shear-carriage and its slide have fixed to them the guides 108 and 108ª, between which the web of paper is guided to the shear.

The pasting-rolls 109 and 110 are carried upon shafts journaled in the brackets 69 and 70, and those shafts are rotated at a regular rate of speed, once for each operation of the shear from the gear 85, by means of an intermediate gear loosely mounted on the shaft 80, as shown in Figs. 16 and 18. The lower roll is designed to support and feed the passing cover, coöperating in its feeding function with the pasting-roll 109. That roll is supplied with paste from a reservoir 111, provided with suitable regulating-gages in any of the well-known ways. Upon the right-hand ends of the brackets 69 and 70 are extensions which serve as guides for the cover as it passes from the pasting-rolls to the grip of the carriers of the folding-section, as shown in Fig. 33. This section of the machine is also provided with a pair of stands or brackets 175, adapted to support the roll of paper from which the cover-web is drawn. Suitable idler-rolls 176 and 177 are also journaled in the brackets 69 and 70, the latter roll being preferably so located that the web of paper in passing from it to the drawing-rolls is wrapped partly around the lower drawing-roll 61. This arrangement forms a loop in the paper and enables it to be guided with greater accuracy, and also enables the drawing-rolls to drive the web with greater positiveness. Guide-plates 178 are preferably carried upon the shaft 92, and serve to guide the paper web from the drawing-rolls into correct relation to the take-up rolls.

The mode of operation of this section of the machine is as follows: The leading end of the web of paper is drawn from the roll, passed around the guide-rollers 176 and 177, between the drawing-rolls 60 and 61, between the take-up rolls 71 and 72, between the guides 108 and 108ª, and between the blades of the shear. By means of its hand-wheel or by means of its driving-pulleys the machine is now put in operation. The drawing-rolls 60 and 61 carry forward the web at a regular rate of speed, and during the time that the shear is open a suitable length is carried beyond the blade to form the width of a cover. At the proper time for the operation of the shear the rotary motion of the take-up rolls, governed by the cam 83, is arrested during that entire operation, and as the drawing-rolls still continue to advance the web a loop is formed therein, as shown in Fig. 15. After the shear returns to its open position the forward rotary movement of the take-up rolls is resumed, carrying the leading end of the web forward at an accelerated rate until the loop which has been formed between it and the drawing-rolls has been taken up. Then the upper take-up roll 71 is raised by the operation of its cam 105, leaving the web to be pushed forward between the shear by the drawing-rolls. During the forward accelerated rotation of the take-up rolls the feed-rolls 73 and 74 have been moved at a similar rate, being connected to the same sector-gear 79, and operate to feed forward the severed cover to the bite of the pasting-rolls 109 and 110. Then the upper roll 73 is raised by the action of its cam 90 simultaneously with the raising of the roll 71, and in this raised position, as shown in Fig. 17, both of those rolls are rotated backward to their first position by the return movement of their sector 79, actuated by its cam 83. This rotary motion is reversed just as they are dropped into contact again with their respective rolls 72 and 74, and they are then rotated forward just enough to stretch the web tightly, when the rotary motion is stopped to allow of the operation of the shear as before. The time of that operation of the shear is made as short as possible in order that the loop formed in the web during its operation shall not be too great to be taken up by the subsequent accelerated movement of the take-up rolls.

The Folding and Delivery Section.

This is best shown in the lower right-hand portion of Fig. 1, and in Figs. 24 to 30, inclusive. It consists of mechanism adapted to receive the plaited tube from the tube-section and the pasted cover from the cover-section, to unite them and deliver them from the machine upon a suitable table by a fly-motion somewhat resembling that by which the printed sheets are delivered from a printing-press, as shown in Fig. 27, from which table they may be removed at convenient intervals by the operator. This mechanism is carried by the brackets 112 and 113, which are bolted upon the bed of the machine. The main shaft 68 is journaled in these brackets, and is connected with the driving-pulley of the machine by suitable gearing, as best seen in Fig. 4, so timed as to make one revolution for each operation of the carriage 36 and its appurtenances.

The delivery mechanism is driven by means of a pinion 114, fixed upon the main shaft 68, which communicates a rotary motion by means of the intermediate gear 115 on the stud 116 to the delivery-roll 117, fixed upon a shaft which is journaled in the arm 118. The rotary motion of the delivery-roll 117 is communicated by it to its mate 119, revolubly mounted on a stud fixed in the bracket 112. The arm 118 is pivotally mounted upon the stud 116, and has a downwardly-projecting member to which is attached the spring 120, the other end of which is attached to a stud in the frame of the machine, and that spring operates to press the delivery-roll 117 toward its mate 119. The portions 117$^a$ and 119$^a$ of the meeting peripheries of the rolls 117 and 119 adjacent to their respective gears are adapted to operate as cams to force the work-engaging peripheries of those rolls apart against the action of the spring 120 at suitable times in their operation, as will be hereinafter described. The delivery-rolls are provided with tapes, which serve to convey the finished bags down to and in front of the engaging arm 121 of the fly, which is pivoted upon a stud in the bed of the machine. A bell-cranked member of the arm 121 is connected by means of the rod 122 to the arm 123, fixed on the shaft 124, all as best shown in Figs. 24 and 27. The shaft 124 is journaled in the bracket 112 and has fixed upon its opposite end a cam-arm 125, which is engaged by the cam 126, fixed on the shaft 68, and that cam operates, by means of its connection just described, to move the fly-arm 121 from its position, shown in Fig. 27, at which it receives the completed work from the delivery-rolls, to its position against the pile of bags shown in that figure.

The mechanism by means of which the pasted cover and its tube are brought from their respective sections into suitable relation to each other, united, and passed to the delivery mechanism will now be described.

Upon the bracket 112 are pivotally mounted the oppositely-disposed guide-bushings 127 and 128. Fixed upon these bushings at the right of their bearing in the bracket 112, as seen in Fig. 25, are the sector-gears 129 and 130, respectively, which mesh together, as best shown in Figs. 29 and 30. The sector 129 is provided with an arm adapted to engage with the cam 126, and may engage in the same groove as that in which the arm 125 engages, but at a point diametrically opposite to the other, as the form of that groove when thus applied is found to be suitable for the movements of both the arms 124 and 129. As communicated to the latter arm its movement operates to cause the guide-bushings to oscillate from the position shown in Fig. 29 to that shown in Fig. 30.

The tubular rods 131 and 132 are fitted to slide through holes in the guide-bushings made concentrically with the bearings thereof, and at their opposite ends are adapted to slide in bearings made in the bracket 113. Upon those ends of the rods which rest in the guide-bushings are loosely fitted the carriers 133 and 134, the external bearing-surfaces of those carriers being fitted to and adapted to be guided by the U-shaped portions of the guide-bushings, which extend to the left of their bearing in the bracket 112. As shown by a comparison of Figs. 29 and 30, the carriers are adapted to be oscillated by the guide-bushings 127 and 128, as the latter are moved by their cam 126. The nature of the connection between the carriers and the rods 131 and 132 is best shown in the sectional view of Fig. 26, wherein the carrier 133 is shown to be mounted on the tubular rod 131 in such a way that the carrier may be moved longitudinally with relation to the guide-bushing 127 by means of the rod while permitting the carrier to oscillate upon its bearing on the rod between two shoulders thereof. The yoke 137 is fixed at its ends to the rods 131 132, and is provided with a projection adapted to engage in the groove 135 of the cam 136, fixed on the shaft 68, thus communicating a longitudinal movement to the rods and their carriers. That longitudinal movement is sufficient to move the carriers toward the left from the position shown in Figs. 1 and 24 to an extent sufficient to enable the carrier to grip each oncoming cover before it leaves the bite of the passing rolls 109 and 110. The carriers are each provided with grippers 138 and 139, respectively, and those grippers are adjustably mounted upon the arms 140 and 141, and those arms are pivotally mounted upon studs fixed in the hubs 142 and 143, respectively, of the carriers. By reference to Fig. 26 it will be seen that the arm 140 projects downwardly through a slot into the hollow center of the tubular rod 131, where it is engaged on the right-hand side thereof by a plunger 146, fitted to slide within the tubular rod 131. The opposite carrier 134 is similarly constructed with a gripper and a plunger, and the two plungers are fixed to their respective ends of the yoke 144. That yoke is provided at its center with a projection adapted to engage in the groove 145 of the cam 136, all as best seen in Fig. 25. The yokes 137 and 144 are provided with tension-springs so connected between them as to tend to press them together for the purpose of drawing the yoke 144 and its attached plungers toward the right, as seen in Figs. 25 and 26, in order that the grippers 138 and 139 may be pressed toward their downward position by their springs. The front ends of the carriers and of their respective grippers are adapted to seize between them the ends of the cover, and each gripper is pressed into contact with its carrier by means of a spring and plug located within the tubular rod and adapted to press against the arm 140 of the grippers, as seen in Fig. 26.

The grooves 135 and 145 of the cam 136 are so formed that the yokes 137 and 144, which engage in and are driven by those grooves, are held in the same relative position to each other as they are caused to reciprocate by the cam, excepting at those points at which it is desired to raise the grippers. Then the groove 145 is made to diverge from its mate, so as to move the yoke 144 away from the yoke 137, thus operating, by means of the plunger within the tubular rods 131 and 132, to raise the grippers of their respective carriers, as shown in dot-and-dash position of the gripper 138 in Fig. 26. When it is desired that the gripper shall be allowed to drop again upon the carrier, the groove 145 is brought nearer to its mate 135, thus drawing back the yoke 144 and its plungers.

The folder-blade 147 is preferably employed to assist the tube in doubling the cover at its central portion, as shown in Figs. 3, 29, and 30. That blade is fixed upon the shaft 148, which is journaled in the brackets 112 and 113, as best shown in Figs. 4 and 25. That shaft has fixed upon its right-hand end the arm 149, which is engaged by the spring 150, and that spring is so attached to the frame of the machine as to press the folder-blade toward its downward position. The arm 149 is connected by means of the rod 151 with the cam-arm 152, and that arm is adapted to engage with the cam 153, fixed on the shaft 41. The cam 153 is so formed as to cause its folder-blade 147 to move with the speed of the crank-driven carriage 136 from the position shown in Fig. 5 until the front end of the tube is seized between the delivery-rolls 117 and 119, thus operating to crease and fold the cover slightly ahead of the advancing end of the tube, so that the latter shall not be bent or otherwise distorted by the resistance of the cover. After the tube and its cover have been gripped by the rolls 117 and 119 the folder-blade returns to its upper position. (Shown in Fig. 7.)

The mode of operation of the tube and of the cover-section has been described in connection with the description of those groups of mechanism up to the point where the respective blanks prepared by them have been presented to the folding and delivery section.

A description will now be given of the mode of operation of the folding and delivery section itself.

The severed and pasted cover is seized at its ends by the carriers and their grippers, as shown in Fig. 33. As the cover-blank is fed forward at uniform linear speed by the pasting-rolls 109 110 the carriers 133 and 134, driven by their cam 136, are carried toward the left to about the position shown in Fig. 33, and on their return stroke toward the right their grippers are allowed to fall upon the cover just at the time when the carriers attain the same linear speed as the cover, and they continue at this speed until the cover has left the bite of the rolls 109 and 110. The motion of the carriers is continued toward the left until the cover reaches its central position with relation to the delivery-rolls, as shown in Fig. 24, which is also central vertically with the advancing tube. At this position of the carriers their longitudinal movement is arrested, their position in end view being as shown in Fig. 29, with the leading end of the advancing tube just touching the cover at the point where the latter is to be doubled. The folder-blade 147 here rests in contact with the cover immediately behind the tube, and as the latter is carried down by the motion of its carriage, as shown in Figs. 5 and 8, the folder-blade is also moved down with its edge slightly in advance of the end of the tube. As the cover is thus deflected at its center by the action of the folder-blade the carriers 133 and 134 are correspondingly moved together from the position shown in Fig. 29 to that of Fig. 30, their grippers retaining their hold upon the ends of the cover until just before the position reached in the latter figure. At that time the leading end of the cover with its inclosed tube has been gripped by the delivery-rolls 117 and 119, when the grippers 138 and 139 are raised, thus releasing the cover from the carriers, which then oscillate apart back to their first position and move forward with their grippers raised ready to engage the next advancing cover.

The cam-shaped portions $117^a$ and $119^a$ of the delivery-rolls (best seen in Fig. 3) are adapted to force the work-engaging peripheries of those rolls apart against the action of the spring 120 to the position shown in Figs. 27 and 29. The object of thus forcing the delivery-rolls apart is to allow the doubled and thickened end of the cover with its inclosed tube to enter freely between the rolls. After the leading end of the cover has passed the line of centers of those rolls, the roll 117 is allowed to drop against its mate 119 and firmly engage the bag. This feature of the rolls also enables us to convey the completed bag off to one side, as shown in Figs. 6 and 27, by releasing the roll 117 after the bag has safely passed into the grip of the traveling tape. We thus allow the two sides of the cover to fold flatly upon its tube without obliging them to bend and follow the curvature of the rolls, as illustrated in Fig. 8. This is particularly desirable in connection with plaited or fluted work, as that bending tends to permanently distort and wrinkle the completed product.

In connection with this machine we employ devices which operate to stop the machine in the event of certain derangements of either one of the paper webs. The principal derangements to which these webs are liable are two—namely, when the web in passing through the mechanism becomes torn or caught, so that it forms a jam or wad, or when it fails altogether of passing into the machine by reason of a break in the web, or by reason of the roll from which that web is drawn becoming exhausted. This stop mechanism is adapted to operate in either of these contingencies and with both of the webs, as will now be described.

Referring to Fig. 2 it will be seen that the belt used for driving the machine is guided upon the tight or the loose pulley, as may be required, by means of the usual belt-guides fixed in the rod 160, which is fitted to slide in the brackets 113 and 161. That rod is provided with a handle 162, by means of which the belt may be shifted by hand, and is provided also with a spring 163, attached to the bracket 113, the tendency of which is to draw the rod to the right, as seen in Fig. 2, and thereby carry the belt from the tight to the loose pulley. The rod 160 is provided at its left-hand end with a notch with which the catch 164 is adapted to engage. That catch is fixed to a short shaft, which is pivotally mounted in the bracket 161 and has fixed upon its opposite end a stop-arm 165. (Best shown in Figs. 11 to 14, inclusive.) That stop-arm is located adjacent to the front carrier 133, which is provided with projecting members adapted to collide with the stop-arm when the derangements occur, and thus operate to raise the catch and release the stop mechanism.

The last-described devices constitute our preferred form of what is herein referred to under the general designation of the "stop mechanism," not desiring to limit ourselves to the above specific construction. We therefore employ the term "stop mechanism" in its broader sense as covering analogous known devices which normally hold the driving gear or belt or clutch in its connected relation to the machine, but which, when released, operate to disengage the driving clutch or belt or gear, so as to disconnect the machine from its source of motion and allow it to come to a stop.

As thus far described the stop mechanism is common to the stop devices employed in connection with both the tube-section and the cover-section, the connection of the tube-section therewith being shown in Figs. 11 to 14, while its connection with the cover-section is shown in Figs. 31 and 32, the latter of which will first be described.

The front carrier 133 is provided with a knock-off lever 166, pivoted thereto, with one end resting in the plane of the stop-arm 165. That lever has jointed at its opposite end a feeler 167, the upper end of that feeler resting in an aperture of that part of the carrier 133 to which the cover is clamped by its gripper. That portion of the gripper which is adjacent to the aperture for the feeler is cut away so as to allow the feeler to pass through, as shown in Fig. 32, when there is no paper between the carrier and its gripper. A spring 168 is attached between the lever and the carrier and has a tension sufficient to carry its end of the lever and the feeler upward, as shown in Fig. 32. Whenever a cover is engaged between the carrier and its gripper the feeler rests against the paper and is held in the position shown in Fig. 31, so that as the carrier moves backward with its cover to the position shown in that figure the lever 166 passes above the engaging portion of the stop-arm 165; but when the carrier on its return does not bring the cover with it the feeler, urged by its spring, passes above the level of the carrier-gripper, allowing the opposite end of its lever to drop to a position in which it collides with the arm 165, as shown in Fig. 32, and operates to lift the catch 164 out of the notch in the rod 160. That shaft being thus freed from its catch is moved by the tension of its spring toward the right and carries the belt from the tight to the loose pulley, thus stopping the machine.

The guiding-bushing 127 is provided with an inclined surface 166$^a$, (best seen in Figs. 31 and 32,) which is adapted to raise the end of the lever 166 as the latter is moved to the left by its carrier, so as to draw the upper end of the feeler below the gripping-surface of its carrier at the time of meeting the advancing cover, in order that that cover may enter positively without being deflected by the feeler.

The devices by means of which the stop mechanism is released when the tube fails to pass properly through the machine will now be described.

A portion 37$^a$ of the bracket 37 lies across and immediately behind the paper tube at a point just below the drawing-rolls, as shown in Figs. 11 to 14 inclusive, and upon the bracket 37 is also pivoted the shaft 169, to which is fixed the feeler 170. The working face of the feeler 170 is provided with a tongue or tongues adapted to enter corresponding recesses in the plate 37$^a$ when there is no paper between them, as shown in Fig. 11. Upon the outer end of the shaft 169 is fixed the arm 171, which is connected by a rod 172 to the dog 173. This dog is pivotally mounted upon the lower end of the arm 165 and is provided with a notch, (shown in Figs. 12 and 14,) into which a projection 133$^a$ of the carrier 133 is adapted to enter when the dog is held in its midway position in the normal operation of the machine, as shown in Fig. 24. A spring 174 is attached between the arm 171 and a convenient stud upon the frame, with tension a little more than sufficient to overcome the weight of the arm and its connecting-rod, so that it operates to press the feeler 170 lightly against the paper tube which passes between it and the cross-plate 37ᵃ. When there is no paper passing through the drawing-rolls and between the feeler and the cross-arm 37ᵃ, the tongues of the feeler are allowed to enter their recesses in the arm, as shown in Fig. 11, being pressed thereto by the operation of the spring 174. This movement of the feeler 170 operates through the connecting-rod to turn the dog 173, as shown in Fig. 12, so that the recess in its face is carried below the line of travel of the projection of the carrier 133ᵃ. That projection 133ᵃ therefore strikes the solid part of the dog and moves the arm 165 and its catch to the position shown in Fig. 12, thus releasing the stop mechanism as before.

When the paper tube fails to pass properly through the carriage the arrested portion accumulates between the feeler and the cross-plate 37ᵃ and is forced by the drawing-rolls into a wad, as shown in Fig. 13, thus operating to crowd the feeler 170, and consequently the dog 173, into the position shown in Fig. 14, in which case the next recurring stroke of the carrier 133 engages with the solid portion of the dog 173 lying below its recess, and thus releases the stop mechanism.

The grippers 138 and 139 are each herein shown to be made in two parts for convenience in adjusting the upper or gripping portion thereof laterally with respect to the carrier, in order to adapt it to properly seize different lengths of covers. When adjusted to its proper position, and at all times during the operation of the machine, these two parts of the gripper are to be regarded as being integral. It is to be noted also that the grippers may be positively connected with their respective plungers by means of suitable joints, thus doing away with their springs. The springs employed between the yokes 137 and 144 may also be dispensed with if the cam-grooves are made sufficiently accurate. In practice, however, we prefer the construction and arrangement herein shown, inasmuch as the springs compensate for inaccuracies of construction, and also compensate for the wear incident to the continued operation of the machine.

In connection with the tube-section of the machine it will be observed that the cutting-off devices for the tube are not dependent in their operation upon the coöperation of the drawing-rolls, inasmuch as the clamping-plate 46 and the cutting-off plate 49 may engage the tube on both sides of the knife, and thus hold it taut during the moment of severance.

Many other ways will occur to those skilled in the art to which this invention pertains in which the various elements of this machine may be modified or equivalent elements substituted therefor without essentially departing from the scope and intent thereof.

We claim as our invention—

1. The herein-described sheet-cutting device consisting of a knife fixed with its cutting edge in suitable relation to the sheet, a pivotally-mounted clamping-plate, having its clamping-surface adjacent to the edge of the knife and normally held below it, with a cutting-off plate pivotally mounted concentrically with the clamping-plate, and adapted to first clamp the sheet against the clamping-plate, and then lift it with the sheet past the edge of the knife for the purpose specified.

2. The herein-described sheet-cutting device, consisting of a knife fixed with its cutting edge in suitable relation to the sheet, a pivotally-mounted clamping-plate, having its clamping-surface adjacent to the edge of the knife and normally held below it, with a cutting-off plate pivotally mounted concentrically with the clamping-plate, and adapted to first clamp the sheet against the clamping-plate, and then lift it with the sheet past the edge of the knife for the purpose specified, with means substantially as described for communicating a suitable oscillation to the cutting-off plate.

3. In combination with means for feeding a web or tube of paper, the herein-described cutting-off device, consisting of a knife carried on a traveling carriage in suitable relation to the moving web, a clamping-plate normally held below the edge of the knife, and a cutting-off plate mounted upon the carriage and adapted to move transversely to the web, whereby the web is first gripped between the clamping-plate and the cutting-off plate, and is then severed by the continued transverse movement of the latter.

4. In combination with means for feeding a web or tube of paper, the herein-described cutting-off device, consisting of a knife carried on a traveling carriage in suitable relation to the moving web, a clamping-plate normally held below the edge of the knife, and a cutting-off plate mounted upon the carriage and adapted to move transversely to the web, whereby the web is first gripped between the clamping-plate and the cutting-off plate, and is then severed by the continued transverse movement of the latter, with means substantially as described for moving the traveling carriage and operating the cutting-off plate.

5. In combination with means for feeding a web or tube of paper, the herein-described cutting-off device, consisting of a reciprocating carriage, provided with a knife located transversely to the web, a pivotally-mounted clamping-plate located on the same side of the web as the knife, and adjacent thereto, and a pivotally-mounted cutting-off plate located upon the opposite side of the web and adapted to move transversely toward the clamping-plate and the knife, whereby the web is first clamped and then severed, substantially as described.

6. In combination with means for feeding a web or tube of paper, the herein-described cutting-off device, consisting of a reciprocating carriage, provided with a knife located thereon transversely to the web, a pivotally-mounted clamping-plate located on the same side of the web as the knife, and adjacent thereto, and a pivotally-mounted cutting-off plate located upon the opposite side of the web and adapted to move transversely toward the clamping-plate and the knife, whereby the web is first clamped and then severed, with means substantially as described adapted to move the reciprocating carriage at a rate of speed slightly greater than that of the tube just at the time of the clamping and severing operation, whereby the tube is stretched tightly at that time for the purpose specified.

7. In combination with means for feeding a web or tube of paper, a cutting-off and delivering device, consisting of a traveling carriage, provided with a fixed knife located transversely thereon, and with a clamping-plate and a cutting-off plate adapted to engage with and sever that portion of the tube which is in advance of the knife, and adapted to deliver and release the portion thus severed at a suitable time thereafter, substantially as described.

8. In combination with means for feeding a web or tube of paper, and with delivery-rolls adapted to receive the cut-off sections thereof, the herein-described cutting-off and delivering device, consisting of a traveling carriage provided with a fixed knife located transversely thereon, a clamping-plate and a cutting-off plate adapted to engage with and sever that portion of the tube which is in advance of the knife, and adapted to deliver and release the portion thus severed into the bite of the delivery-rolls, with means adapted to move the carriage at the linear speed of the delivery-rolls at the time of delivering the severed portion thereto, substantially as described.

9. In combination with a carriage, and with a cutting-off device mounted thereon, a cam-plate adapted to reciprocate in a direction transverse to that of the carriage, and adapted to engage with and operate the cutting-off device during the reciprocation thereof, substantially as described.

10. In combination with means for feeding a paper web or tube in the direction of its length, the herein-described cutting-off device, consisting of a carriage adapted to reciprocate in the general direction of the length of the tube, and a cam-plate, arranged to reciprocate in a direction transverse to that of the carriage and adapted to engage with the cutting-off device throughout the extent of movement of the carriage, whereby the cutting-off device may be operated at any predetermined point in its longitudinal movement, substantially as described.

11. In combination with a reciprocating carriage, and with a cutting-off device mounted thereon, a cam-plate arranged transversely to the direction of the motion of the carriage, and adapted to engage with and operate the cutting-off device during the reciprocation thereof, with means substantially as described for reciprocating the carriage and for moving the cam-plate at a suitable time and relation thereon.

12. In a paper-bag machine of the class specified, in combination with means for folding and cutting off the inner tubular portion, the herein-described devices adapted to sever the cover portion transversely from its web, apply paste at suitable points thereon, and fold the cover upon the outside of the tube, substantially as described.

13. In combination with means for feeding a paper web, a take-up device, consisting of rolls journaled on opposite sides of the web and adapted to normally engage it between them, with means for oscillating those rolls backward and forward, and with means operatively connected with their bearings, adapted to move the rolls out of engagement with the web at suitable times in the oscillation thereof, substantially as described.

14. In combination with means for operating upon a traveling web, the herein-described means of arresting the motion of the web at the point to be operated upon, and for afterward taking up the motion thus lost, consisting of two pairs of rolls adapted to oscillate forward and backward at suitable intervals, one pair journaled on each side of the operating devices, adapted to engage with the web and hold it stationary while the operation is being performed, and adapted to afterward feed forward the web at an accelerated rate until the motion lost during the stoppage has been taken up, substantially as described.

15. In combination with means for feeding the paper web in the direction of its length, and with a shear adapted to make transverse cuts therein, the herein-described take-up and feeding devices for the paper web, consisting of two pairs of rolls journaled adjacent to the shear, and adapted to engage the web on both sides thereof, with means for intermittently oscillating those rolls forward and backward at suitable intervals, all arranged and operating to stop the web while the shear is operating upon it, and to feed forward the web between the recurring operations of the shear.

16. An adjustable shearing device, consisting of a carriage provided with one blade of the shear, and adapted to be adjustably moved in a direction transverse to the position thereof, a reciprocating slide mounted upon the carriage and provided with the other blade of the shear, rods 107, and arms 106, and shaft 105 adapted to adjust the carriage to parallel positions, and shear-actuating arms 99 and 100 adapted to engage in slots in the slide, whereby the shear-actuating means remains in engagement with the slide at the different adjusted positions of the carriage, substantially as described.

17. The herein-described folding device consisting of oppositely-disposed carriers adapted to seize the ends of the sheet or ply to be folded, and adapted to move together with their respective ends of the sheet as the latter is folded, substantially as described.

18. In combination with delivery-rolls, and with a folder-blade adapted to coöperate therewith, a pair of carriers located on opposite sides of the rolls and adapted to guide together their respective ends of the sheet as the latter is folded between the rolls by the blade, substantially as described.

19. In combination with sheet-folding devices, a pair of oppositely-disposed carriers adapted to seize and guide the ends of the sheet while being folded, with means substantially as described for moving the carriers toward each other in time with their respective ends of the sheet as the latter is folded, substantially as described.

20. In combination with sheet-folding devices, a pair of oppositely-disposed reciprocating carriers, adapted to carry a sheet to be folded into the engagement of the folding devices and adapted to guide the sheet during the folding operation, with means substantially as described adapted to operate the carriers.

21. In combination with sheet-folding mechanism, the herein-described reciprocating carriers adapted to seize the sheet to be folded, with means for moving those carriers to and from the plane of the folding devices, and with actuating means adapted to cause the carriers to hold and follow the movement of the sheet during its folding operation, substantially as described.

22. A pair of oppositely-disposed, mated, coacting carriers, each pivoted with a relatively movable gripper, and a pair of oscillating guiding-bushings in which the carriers are mounted and adapted to reciprocate, with means adapted to operate the carriers and the bushings respectively.

23. A carrier provided with a gripper, a shaft adapted to serve as a pivot for the carrier, a guiding-bushing in which the shaft is concentrically mounted and adapted to slide longitudinally therein, the bushing being adapted to oscillate concentrically with the shaft and to move the carrier with it, substantially as described.

24. The combination of a guiding-bushing adapted to oscillate in its bearings, a shaft adapted to slide longitudinally in the bushing, and a carrier loosely journaled upon and adapted to be moved longitudinally with the shaft, and adapted to be engaged by and to move with the transverse oscillations of the bushing, substantially as described.

25. The combination of a carrier, and a tubular shaft upon which that carrier is journaled, a gripper mounted upon the carrier, with its actuating-arm projecting into the tubular shaft, and a plunger adapted to slide within the tubular shaft and engage the arm of the gripper, substantially as described.

26. In combination with a carrier and with its gripper, a tubular shaft on which the carrier is mounted, and a plunger adapted to slide within the tubular shaft and engage with the gripper, substantially as described.

27. In combination with a carrier and with its gripper, a tubular shaft on which the carrier is journaled, a plunger adapted to slide within the tubular shaft and engage the gripper, with means for imparting a reciprocatory movement to the shaft and its plunger, for the purpose specified.

28. In combination with a carrier and with its gripper, a tubular shaft on which the carrier is journaled, an oscillating bushing in which the shaft is fitted to slide longitudinally, and having guiding-flanges adapted to engage with and move the carrier along with the oscillatory movements of the guiding-bushing.

29. In combination with a carrier and with its gripper, a tubular shaft on which the carrier is journaled, an oscillating guiding-bushing in which the shaft is fitted to slide longitudinally, having guiding-flanges adapted to engage with and move the carrier along with the oscillatory movements of the guiding-bushing, and a plunger adapted to slide within the tubular shaft and engage with the gripper, substantially as described.

30. In combination with a carrier and with its gripper, a tubular shaft on which the carrier is journaled, an oscillating guiding-bushing in which the shaft is fitted to slide longitudinally, and having guiding-flanges adapted to engage with and move the carrier along with the oscillatory movements of the guiding-bushing, with means substantially as described adapted to impart a reciprocatory movement to the shaft, and an oscillatory movement to the guiding-bushing, substantially as described.

31. The herein-described compound actuating device, adapted to impart a suitable relative movement to a carrier and to auxiliary devices carried thereon, consisting of a tubular shaft adapted to reciprocate the carrier and a plunger adapted to slide within the shaft and operate the auxiliary parts thereof, with means for imparting to the shaft and to the plunger a suitable relative movement, substantially as described.

32. In combination with sheet-folding devices, a pair of oppositely-disposed carriers each provided with a gripper, a pair of tubular shafts on which those carriers are respectively journaled and a pair of guiding-bushings adapted to support the carriers and their shafts in their longitudinal movements, and adapted to oscillate the carriers upon their respective shafts, substantially as described.

33. In combination with sheet-folding devices, and with carriers and their grippers, adapted to bring the sheets into suitable relation to those folding devices, a pair of tubular shafts on which the carriers are respectively journaled, guiding-bushings adapted to support the carriers and to impart to them a suitable oscillatory motion, and with plungers connected by a yoke, adapted to slide within their respective shafts and adapted to engage with and operate the grippers at suitable times during the movement of the carriers, substantially as described.

34. In a machine of the class specified, adapted to fold together a tube and its cover, in combination with delivery-rolls, and with devices adapted to cut off and deliver the tube into the bite of the delivery-rolls, the herein-described carriers provided with grippers adapted to seize the ends of the covers, with means for moving the carriers together adapted to follow the speed of the cover as it is pushed into the bite of the delivery-rolls, substantially as described.

35. In a machine of the class specified, provided with a stop mechanism and with a reciprocating carrier, the herein-described releasing devices for the stop mechanism, consisting of a knock-off lever mounted upon the carrier and adapted to rest normally with its stop-engaging end in the plane of the engaging portion of the stop mechanism, substantially as described.

36. In a machine of the class specified, provided with a stop mechanism, and with a carrier, the herein-described releasing devices for the stop mechanism, consisting of a lever and its feeler mounted upon the carrier and adapted to be supported by the paper, all arranged and operating to hold the stop-engaging end of the knock-off lever out of the engaging plane of the stop mechanism while the paper is in its normal position upon the carrier, substantially as described.

37. In combination with the stop mechanism of the machine, adapted to be carried to its stopping position by a spring or weight, and to be held in its starting position by a notch and engaging-catch, the herein-described releasing devices for that catch, consisting of a reciprocating carrier adapted to engage the sheet, with a feeler and a knock-off lever mounted upon the carrier and adapted to be pressed against the sheet when the latter is present and in its normal position, whereby the knock-off lever is held out of the position in which it would engage with the catch, substantially as described.

38. In combination with the stop mechanism of the machine, and with a reciprocating carrier provided with a gripper adapted to hold sheets of paper, a knock-off lever and a feeler pivoted upon the carrier and adapted to be pressed into a position in which it will engage with the stop-arm, and a feeler connected with the knock-off lever and adapted to be engaged by the paper in the normal operation of the machine so as to hold its knock-off arm out of engaging position with the stop-arm, substantially as described.

39. In combination with means for drawing the paper into the machine, and with a stop mechanism therefor, a grooved or forked dog mounted upon the stop mechanism adjacent to and adapted to be engaged by a moving portion of the machine, excepting in the central position thereof, a feeler mounted adjacent to and adapted to be supported by the paper when the latter is in its normal position, and operatively connected with the dog so as to hold the latter in its central or non-engaging position during the normal passage of the paper, substantially as described.

40. In combination with means for bringing the paper web into the machine, and with the stop mechanism therefor, a dog mounted upon the stop mechanism adjacent to and adapted to be moved into engaging relation with a moving portion of the machine, and a feeler mounted adjacent to and adapted to be supported by the web in the normal passage of the latter through the machine, operatively connected with the dog and adapted to move the latter into its engaging position when the web is absent, all arranged and operating to release the stop mechanism upon the failure of the web, substantially as described.

41. In combination with means for bringing the web into the machine, and with the stop mechanism therefor, a supporting-plate, a feeler mounted adjacent thereto and adapted to rest against the paper web, with a dog mounted upon the stop mechanism adjacent to and adapted to be moved into engaging relation to a moving portion of the machine, and operatively connected with the feeler, whereby the dog is carried to its engaging position by the feeler when the latter is crowded away from the supporting-plate by an abnormal accumulation of paper between them, substantially as described.

WILLIAM A. LORENZ.
WILLIAM H. HONISS.

Witnesses:
  A. MUTTER,
  JENNIE NELLIS.